US012063359B2

(12) United States Patent
Wang et al.

(10) Patent No.: US 12,063,359 B2
(45) Date of Patent: Aug. 13, 2024

(54) METHOD, AN APPARATUS AND A COMPUTER PROGRAM PRODUCT FOR VIDEO ENCODING AND VIDEO DECODING WITH WAVEFRONT-BASED GRADUAL RANDOM ACCESS

(71) Applicant: Nokia Technologies Oy, Espoo (FI)

(72) Inventors: Limin Wang, San Diego, CA (US); Krit Panusopone, San Diego, CA (US); Seungwook Hong, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 5 days.

(21) Appl. No.: 17/753,455

(22) PCT Filed: Jul. 29, 2020

(86) PCT No.: PCT/EP2020/071353
§ 371 (c)(1),
(2) Date: Mar. 3, 2022

(87) PCT Pub. No.: WO2021/047817
PCT Pub. Date: Mar. 18, 2021

(65) Prior Publication Data
US 2022/0329787 A1    Oct. 13, 2022

Related U.S. Application Data

(60) Provisional application No. 62/899,548, filed on Sep. 12, 2019.

(51) Int. Cl.
*H04N 19/107*    (2014.01)
*H04N 19/109*    (2014.01)
(Continued)

(52) U.S. Cl.
CPC ......... *H04N 19/107* (2014.11); *H04N 19/109* (2014.11); *H04N 19/147* (2014.11);
(Continued)

(58) Field of Classification Search
CPC .. H04N 19/107; H04N 19/109; H04N 19/147; H04N 19/167; H04N 19/51;
(Continued)

(56) References Cited

U.S. PATENT DOCUMENTS

2014/0192897 A1\* 7/2014 Wang ............... H04N 19/70
375/240.25
2020/0092563 A1\* 3/2020 Drugeon ............ H04N 19/157
(Continued)

FOREIGN PATENT DOCUMENTS

WO  WO-2020032049 A1 \* 2/2020 ........... H04N 19/105
WO  WO-2020054781 A1 \* 3/2020
(Continued)

OTHER PUBLICATIONS

Wang et al., "Wavefront-based GRA and Related Syntax", Joint Video Experts Team (JVET) of ITU-T SG 16 WP 3 and ISO/IEC JTC 1/SC 29/WG 11, JVET-O0976, 15th Meeting, Jul. 3-12, 2019, 5 pages.
(Continued)

*Primary Examiner* — Tracy Y. Li
(74) *Attorney, Agent, or Firm* — Harrington & Smith

(57) ABSTRACT

There are disclosed a method and an apparatus for video encoding. The method can include determining that a coding unit is in intra coded area and encoding the coding unit in intra prediction mode into a bitstream unless the intra prediction for the coding unit needs a reference sample for prediction from a dirty area. The method can further include determining that a coding unit is in clean area when the coding unit is encoded in inter prediction mode into a bitstream, the method comprises validating a plurality of inter prediction modes to determine which of the plurality of inter prediction modes do not use reference samples from a dirty area, and defining such inter prediction mode as a valid
(Continued)

POC(n)

POC(n+1)

POC(n+N-1)

inter prediction mode. The method further includes encoding into a bitstream that exact-match is required at a recovery point and encoding into a bitstream an indication of a use of a diagonal refresh; and transmitting the encoded bitstream to a decoder.

15 Claims, 15 Drawing Sheets

(51) Int. Cl.
*H04N 19/147* (2014.01)
*H04N 19/167* (2014.01)
*H04N 19/51* (2014.01)
*H04N 19/593* (2014.01)

(52) U.S. Cl.
CPC ........... *H04N 19/167* (2014.11); *H04N 19/51* (2014.11); *H04N 19/593* (2014.11)

(58) Field of Classification Search
CPC .. H04N 19/593; H04N 19/105; H04N 19/176; H04N 19/55; H04N 19/563
See application file for complete search history.

(56) References Cited

U.S. PATENT DOCUMENTS

2020/0169727 A1* 5/2020 Edpalm ................ H04N 19/137
2021/0227262 A1* 7/2021 Sasaki ................... H04N 19/70

FOREIGN PATENT DOCUMENTS

WO 2020/188149 A1 9/2020
WO 2021/001600 A1 1/2021

OTHER PUBLICATIONS

Wang, "Wavefront-based GRA Method", Joint Video Experts Team (JVET) of ITU-T SG 16 WP 3 and ISO/IEC JTC 1/ SC 29/WG 11, JVET-O0979, 15th Meeting, Jul. 3-12, 2019, 8 pages.

"Advanced Video Coding for Generic Audiovisual services", Series H: Audiovisual and Multimedia Systems, Infrastructure of audiovisual services—Coding of moving Video, Recommendation ITU-T H.264, Apr. 2017, 812 pages.

"High Efficiency Video Coding", Series H: Audiovisual and Multimedia Systems, Infrastructure of audiovisual services—Coding of moving video, Recommendation ITU-T H.265, Feb. 2018, 692 pages.

"Versatile Video Coding", Series H: Audiovisual and Multimedia Systems Infrastructure of audiovisual services—Coding of moving video, Recommendation ITU-T H.266, Aug. 2020, 516 pages.

"Parameter Values for Ultra-High Definition Television Systems for Production and International Programme Exchange", Recommendation ITU-R BT.2020, Aug. 2012, 7 pages.

"Parameter Values for the HDTV Standards for Production and International Programme Exchange", Recommendation ITU-R BT.709-6, Jun. 2015, 19 pages.

"Information Technology—Coding of Audio-Visual Objects—Part 12: ISO Base Media File Format", ISO/IEC 14496-12, Fifth edition, Dec. 15, 2015, 248 pages.

"Information Technology—Coding of Audio-Visual Objects—Part 14: MP4 File Format", ISO/IEC 14496-14, First edition, Nov. 15, 2003, 18 pages.

"Information Technology—Coding of Audio-Visual Objects—Part 15: Advanced Video Coding (AVC) File Format", ISO/IEC 14496-15, First edition, Apr. 15, 2004, 29 pages.

"3rd Generation Partnership Project; Technical Specification Group Services and System Aspects; Transparent end-to-end packet switched streaming service (PSS); 3GPP file format (3GP) (Release 15)", 3GPP TS 26.244, V15.0.0, Jun. 2018, pp. 1-67.

International Search Report and Written Opinion received for corresponding Patent Cooperation Treaty Application No. PCT/EP2020/071353, dated Sep. 2, 2020, 11 pages.

Kazui, "AHG14: Study of methods for progressive intra refresh", Joint Video Experts Team (JVET) of ITU-T SG 16 WP 3 and ISO/IEC JTC 1/SC 29/WG 11, JVET-L0079, 12th Meeting, Oct. 3-12, 2018, pp. 1-9.

Kazui et al., "Proposal of requirement on very low delay coding", Joint Collaborative Team on Video Coding (JCT-VC) of ITU-T SG16 WP3 and ISO/IEC JTC1/SC29/WG11, JCTVC-B031, 2nd Meeting, Jul. 21-28, 2010, pp. 1-10.

* cited by examiner

METHOD, AN APPARATUS AND A COMPUTER PROGRAM PRODUCT FOR VIDEO ENCODING AND VIDEO DECODING WITH WAVEFRONT-BASED GRADUAL RANDOM ACCESS

RELATED APPLICATION

This application claims priority to PCT Application No. PCT/EP2020/071353, filed on Jul. 29, 2020, which claims priority to U.S. Provisional Application No. 62/899,548, filed on Sep. 12, 2019, each of which is incorporated herein by reference in its entirety.

TECHNICAL FIELD

The present invention relates to an apparatus, a method and a computer program for video coding and decoding.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Various technologies for providing three-dimensional (3D) video content are currently investigated and developed. Especially, intense studies have been focused on various multiview applications wherein a viewer is able to see only one pair of stereo video from a specific viewpoint and another pair of stereo video from a different viewpoint. One of the most feasible approaches for such multiview applications has turned out to be such wherein only a limited number of input views, e.g. a mono or a stereo video plus some supplementary data, is provided to a decoder side and all required views are then rendered (i.e. synthesized) locally by the decoder to be displayed on a display.

In the encoding of 3D video content, video compression systems, such as Advanced Video Coding standard (H.264/AVC), the Multiview Video Coding (MVC) extension of H.264/AVC or scalable extensions of HEVC (High Efficiency Video Coding) can be used.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Now there has been invented an improved method and technical equipment implementing the method. Various aspects include a method, an apparatus, a server, a client and a computer readable medium comprising a computer program stored therein, which are characterized by what is stated in the independent claims. Various embodiments are disclosed in the dependent claims.

According to a first aspect, there is provided a method comprising determining that a coding unit is in intra coded area, whereupon the coding unit is encoded in intra prediction mode into a bitstream unless the intra prediction for the coding unit needs a reference sample for prediction from a dirty area; determining that a coding unit is in clean area, whereupon when the coding unit is encoded in inter prediction mode into a bitstream, the method comprises validating a plurality of inter prediction modes to determine which of the plurality of inter prediction modes do not use reference samples from a dirty area, and defining such inter prediction mode as a valid inter prediction mode; encoding into a bitstream that exact-match is required at a recovery point; encoding into a bitstream an indication of a use of a diagonal refresh; and transmitting the encoded bitstream to a decoder.

According to a second aspect, there is provided a method for decoding comprising receiving a bitstream of coded video sequence comprising pictures in a picture order; decoding from the bitstream an indication of a use of a diagonal refresh; determining from a bitstream that exact-match is required at a recovery point; determining that a coding unit is in intra coded area, whereupon the coding unit is decoded in intra prediction mode from a bitstream; determining that a coding unit is in clean area, whereupon a valid inter prediction mode is decoded from a bitstream, and the coding unit is decoded with said valid inter prediction mode.

According to a third aspect, there is provided an apparatus comprising at least one processor, memory including computer program code, the memory and the computer program code configured to, with the at least one processor, cause the apparatus to perform at least the following: determine that a coding unit is in intra coded area, whereupon the apparatus is caused to encode the coding unit in intra prediction mode into a bitstream unless the intra prediction for the coding unit needs a reference sample for prediction from a dirty area; determine that a coding unit is in clean area, whereupon when the coding unit is encoded in inter prediction mode into a bitstream, the apparatus is further caused to validate a plurality of inter prediction modes to determine which of the plurality of inter prediction modes do not use reference samples from a dirty area, and define such inter prediction mode as a valid inter prediction mode; encode into a bitstream that exact-match is required at a recovery point; encode into a bitstream an indication of a use of a diagonal refresh; and transmit the encoded bitstream to a decoder.

According to a fourth aspect, there is provided an apparatus comprising at least one processor, memory including computer program code, the memory and the computer program code configured to, with the at least one processor, cause the apparatus to perform at least the following: receive a bitstream of coded video sequence comprising pictures in a picture order; decode from the bitstream an indication of a use of a diagonal refresh; determine from a bitstream that exact-match is required at a recovery point; determine that a coding unit is in intra coded area, whereupon the apparatus is further caused to decode the coding unit in intra prediction mode from a bitstream; determine that a coding unit is in clean area, whereupon the apparatus is further caused to decode from a bitstream a valid inter prediction mode, and decode the coding unit with said valid inter prediction mode.

According to a fifth aspect, there is provided a computer program product comprising computer program code configured to, when executed on at least one processor, cause an apparatus or a system to determine that a coding unit is in intra coded area, whereupon the apparatus or the system is caused to encode the coding unit in intra prediction mode into a bitstream unless the intra prediction for the coding unit needs a reference sample for prediction from a dirty area; determine that a coding unit is in clean area, whereupon when the coding unit is encoded in inter prediction mode into a bitstream, the apparatus or the system is further caused to validate a plurality of inter prediction modes to determine which of the plurality of inter prediction modes do not use reference samples from a dirty area, and define such inter prediction mode as a valid inter prediction mode; encode into a bitstream that exact-match is required at a recovery point; encode into a bitstream an indication of a use of a diagonal refresh; and transmit the encoded bitstream to a decoder.

According to a sixth aspect, there is provided a computer program product comprising computer program code configured to, when executed on at least one processor, cause an apparatus or a system to receive a bitstream of coded video sequence comprising pictures in a picture order; decode from the bitstream an indication of a use of a diagonal refresh; determine from a bitstream that exact-match is required at a recovery point; determine that a coding unit is in intra coded area, whereupon the apparatus or the system is caused to decode the coding unit in intra prediction mode from a bitstream; determine that a coding unit is in clean area, whereupon the apparatus or the system is caused to decode from a bitstream a valid inter prediction mode, and decode the coding unit with said valid inter prediction mode.

According to a seventh aspect, there is provided an apparatus comprising means for determining that a coding unit is in intra coded area, whereupon the coding unit is encoded in intra prediction mode into a bitstream unless the intra prediction for the coding unit needs a reference sample for prediction from a dirty area; means for determining that a coding unit is in clean area, whereupon when the coding unit is encoded in inter prediction mode into a bitstream, the apparatus comprises means for validating a plurality of inter prediction modes to determine which of the plurality of inter prediction modes do not use reference samples from a dirty area, and means for defining such inter prediction mode as a valid inter prediction mode; means for encoding into a bitstream that exact-match is required at a recovery point; means for encoding into a bitstream an indication of a use of a diagonal refresh; and means for transmitting the encoded bitstream to a decoder.

According to an eighth aspect, there is provided an apparatus for decoding comprising means for receiving a bitstream of coded video sequence comprising pictures in a picture order; means for decoding from the bitstream an indication of a use of a diagonal refresh; means for determining from a bitstream that exact-match is required at a recovery point; means for determining that a coding unit is in intra coded area, whereupon the coding unit is decoded in intra prediction mode from a bitstream; means for determining that a coding unit is in clean area, whereupon a valid inter prediction mode is decoded from a bitstream, and the coding unit is decoded with said valid inter prediction mode.

According to an embodiment, if the reference sample for the intra prediction for the coding unit is in the dirty area, the method comprises extending the intra coded area by one gradual random access.

According to an embodiment, if the reference sample for intra prediction for the coding unit is in the dirty area, the method comprises setting the reference sample as non-available for prediction.

According to an embodiment, the validating of the inter prediction modes comprises determining a best inter prediction mode among valid inter prediction modes based upon rate-distortion costs.

According to an embodiment, the validating of the inter prediction modes comprises restricting a motion search range for an inter prediction mode so that a prediction block for the inter prediction mode does not use any reference samples in the dirty area, and validating other possible inter prediction modes to determine a best prediction mode among the valid inter prediction modes and intra prediction modes based upon a rate-distortion cost for coding the coding unit.

According to an embodiment, the validating of the inter prediction modes comprises determining if the prediction block needs any sample from the dirty area, wherein the method comprises padding the sample in the dirty area using pixels from a clean area.

According to an embodiment, the padding comprises replacing a value of a sample in the dirty area by a value of a closest sample in the clean area.

According to an embodiment, the computer program product is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

Figure 1:
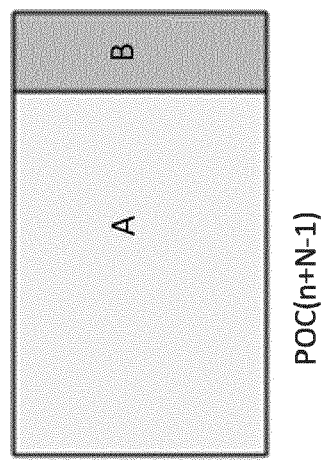
FIG. 1 shows an example of a vertical GRA.
Figure 1:
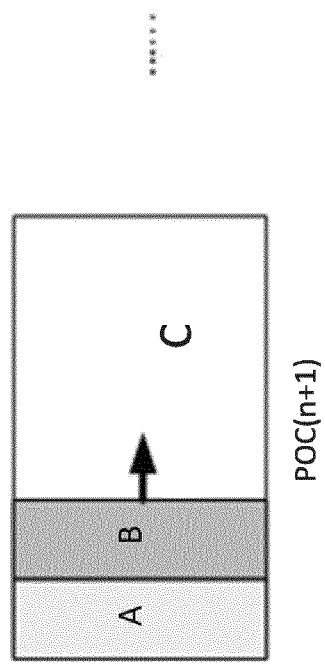
Figure 1:
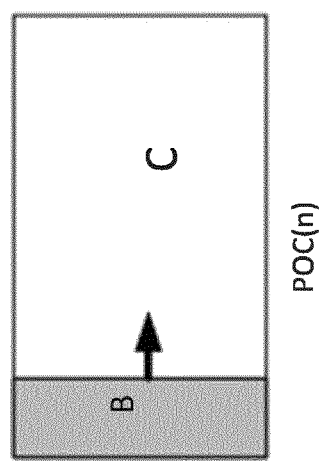

In the following, several embodiments will be described in the context of one video coding arrangement. It is to be noted, however, that the present embodiments are not necessarily limited to the this particular arrangement.

The Advanced Video Coding standard (which may be abbreviated AVC or H.264/AVC) was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organization for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

The High Efficiency Video Coding standard (which may be abbreviated HEVC or H.265/HEVC) was developed by the Joint Collaborative Team-Video Coding (JCT-VC) of VCEG and MPEG. The standard is published by both parent standardization organizations, and it is referred to as ITU-T Recommendation H.265 and ISO/IEC International Standard 23008-2, also known as MPEG-H Part 2 High Efficiency Video Coding (HEVC). Extensions to H.265/HEVC include scalable, multiview, three-dimensional, and fidelity range extensions, which may be referred to as SHVC, MV-HEVC, 3D-HEVC, and REXT, respectively. The references in this description to H.265/HEVC, SHVC, MV-HEVC, 3D-HEVC and REXT that have been made for the purpose of understanding definitions, structures or concepts of these standard specifications are to be understood to be references to the latest versions of these standards that were available before the date of this application, unless otherwise indicated.

The Versatile Video Coding standard (VVC, H.266, or H.266NVC) is presently under development by the Joint Video Experts Team (JVET), which is a collaboration between the ISO/IEC MPEG and ITU-T VCEG.

Some key definitions, bitstream and coding structures, and concepts of H.264/AVC and HEVC and some of their extensions are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC standard—hence, they are described below jointly. The aspects of various embodiments are not limited to H.264/AVC or HEVC or their extensions, but rather the description is given for one possible basis on top of which the present embodiments may be partly or fully realized.

Video codec may comprise an encoder that transforms the input video into a compressed representation suited for storage/transmission and a decoder that can uncompress the compressed video representation back into a viewable form. The compressed representation may be referred to as a bitstream or a video bitstream. A video encoder and/or a video decoder may also be separate from each other, i.e. need not form a codec. The encoder may discard some information in the original video sequence in order to represent the video in a more compact form (that is, at lower bitrate).

Hybrid video codecs, for example ITU-T H.264, may encode the video information in two phases. At first, pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Then, the prediction error, i.e. the difference between the predicted block of pixels and the original block of pixels, is coded. This may be done by transforming the difference in pixel values using a specified transform (e.g. Discreet Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction or current picture referencing), prediction is applied similarly to temporal prediction, but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Intra prediction utilizes the fact that adjacent pixels within the same picture are likely to be correlated. Intra prediction can be performed in spatial or transform domain, i.e., either sample values or transform coefficients can be predicted. Intra prediction may be exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

Video coding standards may specify the bitstream syntax and semantics as well as the decoding process for error-free bitstreams, whereas the encoding process might not be specified, but encoders may just be required to generate conforming bitstreams. Bitstream and decoder conformance can be verified with the Hypothetical Reference Decoder (HRD). The standards may contain coding tools that help in coping with transmission errors and losses, but the use of the tools in encoding may be optional and decoding process for erroneous bitstreams might not have been specified.

A syntax element may be defined as an element of data represented in the bitstream. A syntax structure may be defined as zero or more syntax elements present together in the bitstream in a specified order.

An elementary unit for the input to an encoder and the output of a decoder, respectively, in most cases is a picture. A picture given as an input to an encoder may also be referred to as a source picture, and a picture decoded by a decoded may be referred to as a decoded picture or a reconstructed picture.

The source and decoded pictures are each comprised of one or more sample arrays, such as one of the following sets of sample arrays:
  Luma (Y) only (monochrome).
  Luma and two chroma (YCbCr or YCgCo).
  Green, Blue and Red (GBR, also known as RGB).
  Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of HEVC or alike. A component may be defined as an array or single sample from one of the three sample arrays (luma and two chroma) or the array or a single sample of the array that compose a picture in monochrome format.

A picture may be defined to be either a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays.

Some chroma formats may be summarized as follows:
  In monochrome sampling there is only one sample array, which may be nominally considered the luma array.
  In 4:2:0 sampling, each of the two chroma arrays has half the height and half the width of the luma array.
  In 4:2:2 sampling, each of the two chroma arrays has the same height and half the width of the luma array.
  In 4:4:4 sampling when no separate color planes are in use, each of the two chroma arrays has the same height and width as the luma array.

Coding formats or standards may allow to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

Generally, the source video sequence(s) provided as input for encoding may either represent interlaced source content or progressive source content. Fields of opposite parity have been captured at different times for interlaced source content. Progressive source content contains captured frames. An encoder may encode fields of interlaced source content in two ways: a pair of interlaced fields may be coded into a coded frame or a field may be coded as a coded field. Likewise, an encoder may encode frames of progressive source content in two ways: a frame of progressive source content may be coded into a coded frame or a pair of coded fields. A field pair or a complementary field pair may be defined as two fields next to each other in decoding and/or output order, having opposite parity (i.e. one being a top field and another being a bottom field) and neither belonging to any other complementary field pair. Some video coding standards or schemes allow mixing of coded frames and coded fields in the same coded video sequence. Moreover, predicting a coded field from a field in a coded frame and/or predicting a coded frame for a complementary field pair (coded as fields) may be enabled in encoding and/or decoding.

Partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures may be divided into coding units (CU) covering the area of the picture. A CU consists of one or more prediction units (PU) defining the prediction process for the samples within the CU and one or more transform units (TU) defining the prediction error coding process for the samples in the said CU. The CU may consist of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU may have at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It may be signalled at CU level whether prediction error coding is applied or not for each CU. In the case there is no prediction error residual associated with the CU, it can be considered there are no TUs for the said CU. The division of the image into CUs, and division of CUs into PUs and TUs may be signalled in the bitstream allowing the decoder to reproduce the intended structure of these units.

In a draft version of H.266/VVC, the following partitioning applies. It is noted that what is described here might still evolve in later draft versions of H.266/VVC until the standard is finalized Pictures are partitioned into CTUs similarly to HEVC, although the maximum CTU size has been increased to 128×128. A coding tree unit (CTU) is first partitioned by a quaternary tree (a.k.a. quadtree) structure. Then the quaternary tree leaf nodes can be further partitioned by a multi-type tree structure. There are four splitting types in multi-type tree structure, vertical binary splitting, horizontal binary splitting, vertical ternary splitting, and horizontal ternary splitting. The multi-type tree leaf nodes are called coding units (CUs). CU, PU and TU have the same block size, unless the CU is too large for the maximum transform length. A segmentation structure for a CTU is a quadtree with nested multi-type tree using binary and ternary splits, i.e. no separate CU, PU and TU concepts are in use except when needed for CUs that have a size too large for the maximum transform length. A CU can have either a square or rectangular shape.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF).

The deblocking loop filter may include multiple filtering modes or strengths, which may be adaptively selected based on the features of the blocks adjacent to the boundary, such as the quantization parameter value, and/or signaling included by the encoder in the bitstream. For example, the deblocking loop filter may comprise a normal filtering mode and a strong filtering mode, which may differ in terms of the number of filter taps (i.e. number of samples being filtered on both sides of the boundary) and/or the filter tap values. For example, filtering of two samples along both sides of the boundary may be performed with a filter having the impulse response of (3 7 9 −3)/16, when omitting the potential impact of a clipping operation.

The motion information may be indicated with motion vectors associated with each motion compensated image block in video codecs. Each of these motion vectors represents the displacement of the image block in the picture to be coded (in the encoder side) or decoded (in the decoder side) and the prediction source block in one of the previously coded or decoded pictures. In order to represent motion vectors efficiently those may be coded differentially with respect to block specific predicted motion vectors. The predicted motion vectors may be created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index may be predicted from adjacent blocks and/or co-located blocks in temporal reference picture. Moreover, high efficiency video codecs may employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

Video codecs may support motion compensated prediction from one source image (uni-prediction) and two sources (bi-prediction). In the case of uni-prediction a single motion vector is applied whereas in the case of bi-prediction two motion vectors are signaled and the motion compensated predictions from two sources are averaged to create the final sample prediction. In the case of weighted prediction, the relative weights of the two predictions can be adjusted, or a signaled offset can be added to the prediction signal.

In addition to applying motion compensation for inter picture prediction, similar approach can be applied to intra picture prediction. In this case the displacement vector indicates where from the same picture a block of samples can be copied to form a prediction of the block to be coded or decoded. This kind of intra block copying methods can improve the coding efficiency substantially in presence of repeating structures within the frame—such as text or other graphics.

The prediction residual after motion compensation or intra prediction may be first transformed with a transform kernel (like DCT) and then coded. The reason for this is that often there still exists some correlation among the residual and transform can in many cases help reduce this correlation and provide more efficient coding.

Video encoders may utilize Lagrangian cost functions to find optimal coding modes, e.g. the desired Macroblock mode and associated motion vectors. This kind of cost function uses a weighting factor 0.1 to tie together the (exact or estimated) image distortion due to lossy coding methods and the (exact or estimated) amount of information that is required to represent the pixel values in an image area:

$$C=D+\lambda R \quad (\text{Eq. 1})$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Some codecs use a concept of picture order count (POC). A value of POC is derived for each picture and is non-decreasing with increasing picture position in output order. POC therefore indicates the output order of pictures. POC may be used in the decoding process for example for implicit scaling of motion vectors and for reference picture list initialization. Furthermore, POC may be used in the verification of output order conformance.

In video coding standards, a compliant bit stream must be able to be decoded by a hypothetical reference decoder that may be conceptually connected to the output of an encoder and consists of at least a pre-decoder buffer, a decoder and an output/display unit. This virtual decoder may be known as the hypothetical reference decoder (HRD) or the video buffering verifier (VBV). A stream is compliant if it can be decoded by the HRD without buffer overflow or, in some cases, underflow. Buffer overflow happens if more bits are to be placed into the buffer when it is full. Buffer underflow happens if some bits are not in the buffer when said bits are to be fetched from the buffer for decoding/playback. One of the motivations for the HRD is to avoid so-called evil bitstreams, which would consume such a large quantity of resources that practical decoder implementations would not be able to handle.

HRD models may include instantaneous decoding, while the input bitrate to the coded picture buffer (CPB) of HRD may be regarded as a constraint for the encoder and the bitstream on decoding rate of coded data and a requirement for decoders for the processing rate. An encoder may include a CPB as specified in the HRD for verifying and controlling that buffering constraints are obeyed in the encoding. A decoder implementation may also have a CPB that may but does not necessarily operate similarly or identically to the CPB specified for HRD.

A Decoded Picture Buffer (DPB) may be used in the encoder and/or in the decoder. There may be two reasons to buffer decoded pictures, for references in inter prediction and for reordering decoded pictures into output order. Some coding formats, such as HEVC, provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output. An HRD may also include a DPB. DPBs of an HRD and a decoder implementation may but do not need to operate identically.

Output order may be defined as the order in which the decoded pictures are output from the decoded picture buffer (for the decoded pictures that are to be output from the decoded picture buffer).

A decoder and/or an HRD may comprise a picture output process. The output process may be considered to be a process in which the decoder provides decoded and cropped pictures as the output of the decoding process. The output process may be a part of video coding standards, e.g. as a part of the hypothetical reference decoder specification. In output cropping, lines and/or columns of samples may be removed from decoded pictures according to a cropping rectangle to form output pictures. A cropped decoded picture may be defined as the result of cropping a decoded picture based on the conformance cropping window specified e.g. in the sequence parameter set that is referred to by the corresponding coded picture.

One or more syntax structures for (decoded) reference picture marking may exist in a video coding system. An encoder generates an instance of a syntax structure e.g. in each coded picture, and a decoder decodes an instance of the syntax structure e.g. from each coded picture. For example, the decoding of the syntax structure may cause pictures to be adaptively marked as "used for reference" or "unused for reference".

A reference picture set (RPS) syntax structure of HEVC is an example of a syntax structure for reference picture marking. A reference picture set valid or active for a picture includes all the reference pictures that may be used as reference for the picture and all the reference pictures that are kept marked as "used for reference" for any subsequent pictures in decoding order. The reference pictures that are kept marked as "used for reference" for any subsequent pictures in decoding order but that are not used as reference picture for the current picture or image segment may be considered inactive. For example, they might not be included in the initial reference picture list(s).

In some coding formats and codecs, a distinction is made between so-called short-term and long-term reference pictures. This distinction may affect some decoding processes such as motion vector scaling. Syntax structure(s) for marking reference pictures may be indicative of marking a picture as "used for long-term reference" or "used for short-term reference".

In some coding formats, reference picture for inter prediction may be indicated with an index to a reference picture list. In some codecs, two reference picture lists (reference picture list 0 and reference picture list 1) are generated for each bi-predictive (B) slice, and one reference picture list (reference picture list 0) is formed for each inter-coded (P) slice.

A reference picture list, such as the reference picture list 0 and the reference picture list 1, may be constructed in two steps: First, an initial reference picture list is generated. The initial reference picture list may be generated using an algorithm pre-defined in a standard. Such an algorithm may use e.g. POC and/or temporal sub-layer, as the basis. The algorithm may process reference pictures with particular marking(s), such as "used for reference", and omit other reference pictures, i.e. avoid inserting other reference pictures into the initial reference picture list. An example of such other reference picture is a reference picture marked as "unused for reference" but still residing in the decoded picture buffer waiting to be output from the decoder. Second, the initial reference picture list may be reordered through a specific syntax structure, such as reference picture list reordering (RPLR) commands of H.264/AVC or reference picture list modification syntax structure of HEVC or anything alike. Furthermore, the number of active reference pictures may be indicated for each list, and the use of the pictures beyond the active ones in the list as reference for inter prediction is disabled. One or both the reference picture list initialization and reference picture list modification may process only active reference pictures among those reference pictures that are marked as "used for reference" or alike.

Scalable video coding refers to coding structure where one bitstream can contain multiple representations of the content at different bitrates, resolutions or frame rates. In these cases, the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream may include a "base layer" providing the lowest quality video available and one or more enhancement layers that enhance the video quality when received and decoded together with the lower layers. In order to improve coding efficiency for the enhancement layers, the coded representation of that layer may depend on the lower layers. E.g. the motion and mode information of the enhancement layer can be predicted from lower layers. Similarly, the pixel data of the lower layers can be used to create prediction for the enhancement layer.

A scalable video codec for quality scalability (also known as Signal-to-Noise or SNR) and/or spatial scalability may be implemented as follows. For a base layer, a conventional non-scalable video encoder and decoder is used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use e.g. with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer.

Spatial scalability: Base layer pictures are coded at a lower resolution (i.e. have fewer samples) than enhancement layer pictures. Spatial scalability and quality scalability may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability enhancement layer pictures have a richer/broader color representation range than that of the base layer pictures—for example the enhancement layer may have UHDTV (ITU-R BT.2020) color gamut and the base layer may have the ITU-R BT.709 color gamut.

Region-of-interest (ROI) scalability: An enhancement layer represents of spatial subset of the base layer. ROI scalability may be used together with other types of scalability, e.g. quality or spatial scalability so that the enhancement layer provides higher subjective quality for the spatial subset.

View scalability, which may also be referred to as multiview coding. The base layer represents a first view, whereas an enhancement layer represents a second view.

Depth scalability, which may also be referred to as depth-enhanced coding A layer or some layers of a bitstream may represent texture view(s), while other layer or layers may represent depth view(s).

In all of the above scalability cases, base layer information could be used to code enhancement layer to minimize the additional bitrate overhead.

Scalability can be enabled in two basic ways. Either by introducing new coding modes for performing prediction of pixel values or syntax from lower layers of the scalable representation or by placing the lower layer pictures to the reference picture buffer (decoded picture buffer, DPB) of the higher layer. The first approach is more flexible and thus can provide better coding efficiency in most cases. However, the second, reference frame-based scalability, approach can be implemented very efficiently with minimal changes to single layer codecs while still achieving majority of the coding efficiency gains available. Essentially a reference frame-based scalability codec can be implemented by utilizing the same hardware or software implementation for all the layers, just taking care of the DPB management by external means.

An elementary unit for the output of encoders of some coding formats, such as HEVC, and the input of decoders of some coding formats, such as HEVC, is a Network Abstraction Layer (NAL) unit. For transport over packet-oriented networks or storage into structured files, NAL units may be encapsulated into packets or similar structures.

NAL units consist of a header and payload. In HEVC, a two-byte NAL unit header is used for all specified NAL unit types, while in other codecs NAL unit header may be similar to that in HEVC.

In HEVC, the NAL unit header contains one reserved bit, a six-bit NAL unit type indication, a three-bit temporal_id_plus1 indication for temporal level or sub-layer (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream. Such temporal scalable layer may comprise VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units may be coded slice NAL units. In HEVC, VCL NAL units contain syntax elements representing one or more CU. In HEVC, the NAL unit type within a certain range indicates a VCL NAL unit, and the VCL NAL unit type indicates a picture type.

Images can be split into independently codable and decodable image segments (e.g. slices or tiles or tile groups). Such image segments may enable parallel processing, "Slices" in this description may refer to image segments constructed of certain number of basic coding units that are processed in default coding or decoding order, while "tiles" may refer to image segments that have been defined as rectangular image regions. A tile group may be defined as a group of one or more tiles. Image segments may be coded as separate units in the bitstream, such as VCL NAL units in H.264/AVC and HEVC. Coded image segments may comprise a header and a payload, wherein the header contains parameter values needed for decoding the payload.

In the HEVC standard, a picture can be partitioned in tiles, which are rectangular and contain an integer number of CTUs. In the HEVC standard, the partitioning to tiles forms a grid that may be characterized by a list of tile column widths (in CTUs) and a list of tile row heights (in CTUs). Tiles are ordered in the bitstream consecutively in the raster scan order of the tile grid. A tile may contain an integer number of slices.

In the HEVC, a slice consists of an integer number of CTUs. The CTUs are scanned in the raster scan order of CTUs within tiles or within a picture, if tiles are not in use. A slice may contain an integer number of tiles or a slice can be contained in a tile. Within a CTU, the CUs have a specific scan order.

In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL (Network Abstraction Layer) unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

In a draft version of H.266/VVC, pictures are partitioned to tile along a tile grid (similarly to HEVC). Tiles are ordered in the bitstream in tile raster scan order within a picture, and CTUs are ordered in the bitstream in raster scan order within a tile. A tile group contains one or more entire tiles in bitstream order (i.e. tile raster scan order within a picture), and a VCL NAL unit contains one tile group. Slices have not been included in the draft version of H.266/VVC. It is noted that what was described in this paragraph might still evolve in later draft versions of H.266/VVC until the standard is finalized.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. An MCTS sequence may be defined as a sequence of respective MCTSs in one or more coded video sequences or alike. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures. A motion-constrained tile set may be regarded as an independently coded tile set, since it may be decoded without the other tile sets.

It is appreciated that sample locations used in inter prediction may be saturated so that a location that would be outside the picture otherwise is saturated to point to the corresponding boundary sample of the picture. Hence, in some use cases, if a tile boundary is also a picture boundary, motion vectors may effectively cross that boundary or a motion vector may effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

The temporal motion-constrained tile sets SEI (Supplemental Enhancement Information) message of HEVC can be used to indicate the presence of motion-constrained tile sets in the bitstream.

In wavefront parallel processing (WPP) each block row (such as CTU row in HEVC) of an image segment can be encoded and decoded in parallel. When WPP is used, the state of the entropy codec at the beginning of a block row is obtained from the state of the entropy codec of the block row above after processing a certain block, such as the second block, of that row. Consequently, block rows can be processed in parallel with a delay of a certain number of blocks (e.g. 2 blocks) per each block row. In other words, the processing of the current block row can be started when the processing of the block with certain index of the previous block row has been finished. The same or similar difference between decoding block rows is kept throughout the block row due to potential prediction dependencies, such as directional intra prediction from the upper right block. Thanks to WPP property, block rows can be processed in a parallel fashion. In general, it may be pre-defined e.g. in a coding standard which CTU is used for transferring the entropy (de)coding state of the previous row of CTUs or it may be determined and indicated in the bitstream by the encoder and/or decoded from the bitstream by the decoder. Wavefront parallel processing with a delay less than 2 blocks may require constraining some prediction modes so that prediction from above and right side of the current block is avoided. The per-block-row delay of wavefronts may be pre-defined, e.g. in a coding standard, and/or indicated by the encoder in or along the bitstream, and/or concluded by the decoder from or along the bitstream.

WPP processes rows of coding tree units (CTU) in parallel while preserving all coding dependencies. In WPP, entropy coding, predictive coding as well as in-loop filtering can be applied in a single processing step, which makes the implementations of WPP rather straightforward.

When a coded picture has been constrained for wavefront processing or when tiles have been used, CTU rows or tiles (respectively) may be byte-aligned in the bitstream and may be preceded by a start code. Additionally, entry points may be provided in the bitstream (e.g. in the slice header) and/or externally (e.g. in a container file). An entry point is a byte pointer or a byte count or a similar straightforward reference mechanism to the start of a CTU row (for wavefront-enabled coded pictures) or a tile. In HEVC, entry points may be specified using entry_point_offset_minus1[i] of the slice header.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Some coding formats specify parameter sets that may carry parameter values needed for the decoding or reconstruction of decoded pictures. Parameters that remain unchanged through a coded video sequence may be included in a sequence parameter set (SPS). In addition to the parameters that may be needed by the decoding process, the sequence parameter set may optionally contain video usability information (VUI), which includes parameters that may be important for buffering, picture output timing, rendering, and resource reservation. A picture parameter set (PPS) contains such parameters that are likely to be unchanged in several coded pictures. A picture parameter set may include parameters that can be referred to by the coded image segments of one or more coded pictures. A header parameter set (HPS) has been proposed to contain such parameters that may change on picture basis.

A parameter set may be activated when it is referenced e.g. through its identifier. For example, a header of an image segment, such as a slice header, may contain an identifier of the PPS that is activated for decoding the coded picture containing the image segment. A PPS may contain an identifier of the SPS that is activated, when the PPS is activated. An activation of a parameter set of a particular type may cause the deactivation of the previously active parameter set of the same type.

Instead of or in addition to parameter sets at different hierarchy levels (e.g. sequence and picture), video coding formats may include header syntax structures, such as a sequence header or a picture header. A sequence header may precede any other data of the coded video sequence in the bitstream order. A picture header may precede any coded video data for the picture in the bitstream order.

The phrase along the bitstream (e.g. indicating along the bitstream) or along a coded unit of a bitstream (e.g. indicating along a coded tile) may be used in claims and described embodiments to refer to transmission, signaling, or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

A coded picture is a coded representation of a picture.

A Random Access Point (RAP) picture, which may also be referred to as an intra random access point (IRAP) picture, may comprise only intra-coded image segments. Furthermore, a RAP picture may constrain subsequence pictures in output order to be such that they can be correctly decoded without performing the decoding process of any pictures that precede the RAP picture in decoding order.

An access unit may comprise coded video data for a single time instance and associated other data. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

It may be required that coded pictures appear in certain order within an access unit. For example, a coded picture with nuh_layer_id equal to nuhLayerIdA may be required to precede, in decoding order, all coded pictures with nuh_layer_id greater than nuhLayerIdA in the same access unit.

A bitstream may be defined as a sequence of bits, which may in some coding formats or standards be in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. In some coding formats or standards, the end of the first bitstream may be indicated by a specific NAL unit, which may be referred to as the end of bitstream (EOB) NAL unit and which is the last NAL unit of the bitstream.

A coded video sequence (CVS) may be defined as such a sequence of coded pictures in decoding order that is independently decodable and is followed by another coded video sequence or the end of the bitstream.

Bitstreams or coded video sequences can be encoded to be temporally scalable as follows. Each picture may be assigned to a particular temporal sub-layer. Temporal sub-layers may be enumerated e.g. from 0 upwards. The lowest temporal sub-layer, sub-layer 0, may be decoded independently. Pictures at temporal sub-layer 1 may be predicted from reconstructed pictures at temporal sub-layers 0 and 1. Pictures at temporal sub-layer 2 may be predicted from reconstructed pictures at temporal sub-layers 0, 1, and 2, and so on. In other words, a picture at temporal sub-layer N does not use any picture at temporal sub-layer greater than N as a reference for inter prediction. The bitstream created by excluding all pictures greater than or equal to a selected sub-layer value and including pictures remains conforming.

A sub-layer access picture may be defined as a picture from which the decoding of a sub-layer can be started correctly, i.e. starting from which all pictures of the sub-layer can be correctly decoded. In HEVC there are two picture types, the temporal sub-layer access (TSA) and step-wise temporal sub-layer access (STSA) picture types, that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). The ISO file format is the base for derivation of all the above mentioned file formats (excluding the ISO file format itself). These file formats (including the ISO file format itself) are generally called the ISO family of file formats.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding TrackBox ('trak'). A track may be one of the many types, including a media track that refers to samples formatted according to a media compression format (and its encapsulation to the ISO base media file format). A track may be regarded as a logical channel.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used, and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited, and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs (a.k.a. track fragment runs), each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es).

TrackGroupBox, which is contained in TrackBox, enables indication of groups of tracks where each group shares a particular characteristic or the tracks within a group have a particular relationship. The box contains zero or more boxes, and the particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group.

In the current video coding design (e.g. AVC, HEVC and VVC), a coded video sequence comprises intra coded pictures (i.e. I pictures) and inter coded pictures (e.g. P and B pictures). Intra coded pictures may use many more bits than inter coded pictures. Transmission time of such large (in size) intra coded pictures increases the encoder to decoder delay.

It is appreciated that intra coded picture are not suitable for (ultra) low delay applications because of the long encoder to decoder delay. However, an intra coded picture is needed at random access point. Therefore, for (ultra) low delay applications, it may be desirable that the both intra coded pictures and inter coded pictures have similar number of bits so that the encoder to decoder delay can be reduced to around 1 picture interval.

Gradual random access (GRA) alleviates the delay issue with intra coded pictures. Instead of coding an intra picture at a random access point, GRA progressively refreshes pictures by spreading intra coded regions (groups of intra coded blocks) over several pictures.

Pictures within the refresh period, i.e. pictures from the random access point (inclusive) to the recovery point (exclusive), may be considered to have at least two regions, a refreshed region and a "dirty" region. The refreshed region can be exactly or approximately correctly decoded when the decoding is started from the random access point, while the decoded "dirty" region might not be correct in content when the decoding is started from the random access point. The refreshed region may only inter-predicted from the refreshed region of the reference pictures within the same refresh period, i.e. sample values of the "dirty" region are not used in inter prediction of the refreshed region. Since the refreshed region in a picture may be larger than the refreshed region in the previous pictures, the intra coding may be used for the coding block locations that are newly added in the refreshed region compared to the refreshed regions of earlier pictures in the same refresh period.

A gradual random access (GRA) picture, in general, comprises three areas. FIG. 1 illustrates an example of a vertical GRA, where intra coded area B is spread over several pictures from left to right on a picture-by-picture basis so that each pixel is coded in intra mode at least once within a certain period. A clean area A is gradually expanded vertically from left to the right. The white area C represents a dirty area.

There are several gradual random access solutions, for example, horizontal and vertical GRA, and wavefront-based GRA.

Figure 2:
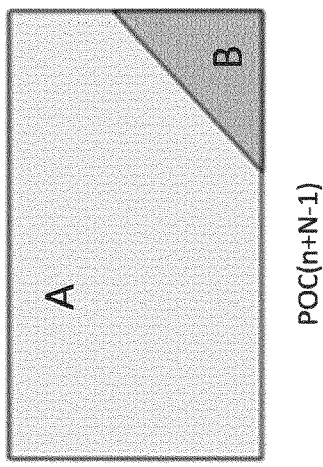
FIG. 2 shows an example of wavefront GRA.
Figure 2:
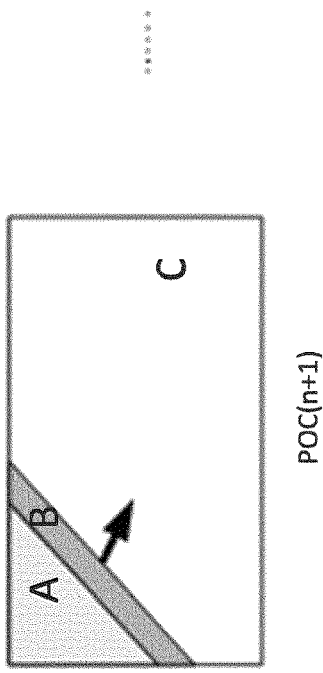
Figure 2:
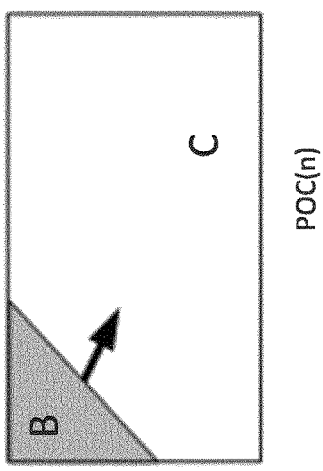

In a wavefront-based GRA, the intra coded area is of wavefront shape, as shown in FIG. 2. Wavefront-based GRA according to present embodiments, spreads intra coded regions over several pictures and gradually expands a clean area diagonally from the top-left corner to the bottom-right corner. Assuming that POC(n) is a random access point, and POC(n+N−1) is the recovery point. At POC(n), the top-left corner regions (B) are coded in intra mode. At POC(n+1), the intra coded region at POC(n) becomes the clean area (A), and the wavefront area (B) next to the clean area is coded in intra mode. At POC(n+2), the clean area and intra coded area at POC(n+1) becomes the clean area (A), and the wavefront area (B) next to the clean area is coded in intra mode. the process continues, and the clean area is gradually expanded. At POC(n+N−1) the clean area and intra coded area at POC (n+N−1) becomes the clean area (A), and the bottom-right corner region (B) next to the clean area is coded in intra mode. The area denoted with C is the dirty area.

It is appreciated that since the clean area in the current picture is larger than the clean areas in the reference pictures of the current picture, the collocated blocks that are present in the clean areas may be inter-coded, and the remaining blocks in the intra coded area of the current picture may be intra-coded as discussed above. However, generally there are no restrictions on which coding modes are selected for blocks in the clean area in pictures that are not the first picture of a refresh period. For example, the coding mode of blocks may be selected using rate-distortion (RD) optimization.

When the wavefront-based GRA approach is compared to other GRA approaches, e.g. to vertical GRA and horizontal GRA, it is realized that with the wavefront-based GRA, the reference samples for the (intra) blocks in intra coded area B can be either in clean area A or intra coded area B. Therefore, there is no restriction on intra prediction modes for the blocks in intra coded area.

Figure 3:
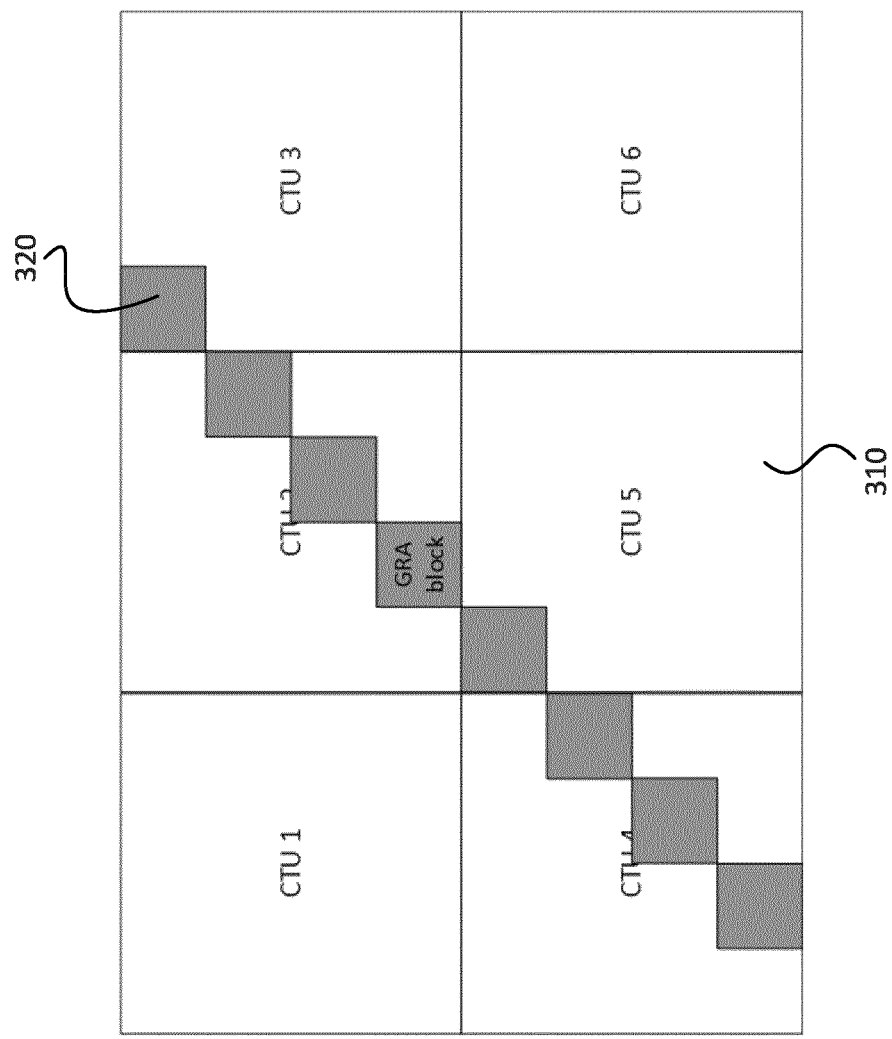
FIG. 3 shows an example of GRA blocks and CTUs.

The intra GRA blocks of intra coded area are not necessarily CTUs, as shown in FIG. 3. This means that intra GRA blocks in intra coded area can have different size than CTU. For example, CTU size can be of 128×128 as in JVET CTC while intra GRA block size can be set based upon picture size and frame rate, e.g. 16×16 for JVET class D sequence. FIG. 3 shows an example where a current picture is divided into CTUs (CTU1-CTU6) 310 and set of intra GRA blocks 320 along a diagonal line. Both CTU and intra GRA blocks are square, and intra GRA block should not be greater than CTU.

Partitioning rules for a block comprises:
1. If a block does not contain any intra GRA block, like CTU1 and CTU6 in FIG. 3, a normal partition procedure is performed, for example Quaternary Tree (QT), Binary tree (BT) and Ternary Tree (TT) partitioning are allowed.

2. If a block contains at least one intra GRA block, like CTU2, CTU3, CTU4 and CTU5 in FIG. 3, some restrictions on partition are imposed. Specifically, partition line should not cut through intra GRA blocks.
3. GRA blocks can further be partitioned into (smaller) CUs.
4. The final CUs outside GRA blocks can be coded in either intra or inter mode.
5. The final CUs inside GRA blocks are all coded in intra mode.

In HEVC, when exact_match_flag is equal to 1, it is required that the decoded pictures at and subsequent to the specified recovery point in output order derived by starting the decoding process at the access unit associated with the recovery point SEI message, shall be an exact match to the pictures that would be produced by starting the decoding process at the location of a previous IRAP access unit, if any, in the bitstream.

If "exact_match" is required as in HEVC, only the coding information (such as reconstructed pixels, coding modes, etc.) associated with clean areas and intra coded areas can be used for decoding the pictures within the refresh period, i.e. between the random access point and the recovery point. Specifically, intra CUs in intra coded area cannot use any pixels in dirty area as reference samples for intra prediction. An inter CU in clean area cannot have its prediction block to use any pixels in dirty areas of reference pictures. The in-loop filtering (deblocking, SAO, etc.) cannot use any pixels in dirty area in calculating the filtered samples.

The present embodiments provide four aspects to meet the requirement of "exact_match" at the recovery point for GRA by properly defining intra coded area per GRA picture and selecting code modes for CUs in clean area. The four aspects relate to intra coded area, code modes in clean area, validation process for inter modes and padding process.

In the present embodiments, the following is applied:
1. In intra coded area, all CUs are coded in intra prediction mode. Intra prediction mode for a current CU can only use reference samples (or pixels) from clean area and intra coded area, not any samples (or pixels) from a dirty area.
    a. With wavefront-based GRA approach, an encoder can have all the reference samples (or pixels) of intra prediction modes for CUs in intra coded area in either clean area or intra coded area, by avoiding a special case where the GRA block is the top-left subblock of a parent block. In such special case, the encoder can extend the intra coded area by one GRA. Due to the extension, all the reference samples (or pixels) of intra prediction modes for CUs in intra coded area are either in clean area or in intra coded area. Thus, there is no need to add any restriction on CUs in intra coded area;
    b. Alternatively, if any pixel in dirty area needs to be used for intra prediction for CUs in intra coded area, such pixel can be set as "not available", whereupon the pixel in dirty area will not be used for CUs in intra coded area. Such an approach can be applied also to other types of GRA approaches, e.g. horizontal GRA and vertical GRA, not only to wavefront-based GRA.
2. In clean area, a CU can be coded in intra or inter mode. A CU in inter prediction mode is able to find a prediction block in reference pictures using an associated MV (Motion Vector). Prediction block for the inter prediction mode cannot use any pixels in dirty areas of reference pictures. Therefore, the inter prediction modes shall be validated. If prediction block for a current CU in an inter mode uses any reference samples (i.e. reference pixels) in dirty area, that inter prediction mode is disallowed for the current CU. In the following, there are a few specific solution options for a CU in clean area:
    a. At first possible inter modes are validated and then the best mode among the valid inter modes and intra mode for a current CU is determined based upon the RD cost.
    b. A motion search range for regular inter prediction mode is restricted so that a prediction block for regular inter prediction mode will not use any samples (pixels) in dirty area; therefore, regular inter prediction mode is valid, and there is no need to further validate the regular inter prediction mode. Then, other possible inter prediction modes are validated. And finally the best mode among the valid inter prediction modes and intra prediction modes for the current CU is determined based upon RD cost.
    c. If the prediction block needs to use any pixel from a dirty area, the pixel can be padded using the pixels from clean area or replaced by a fixed value. This option will avoid validation process.

It is appreciated that the validation process and the padding process apply not only to wavefront-based GRA, but also to other GRA approaches, e.g. horizontal GRA and vertical GRA.

Intra Coded Area

All the CUs in intra coded area are coded in intra mode. A CU in intra mode uses the reconstructed pixels of its above, above-right, above-left, left and bottom-left neighboring blocks as the reference samples in intra prediction.

In general, with wavefront-based GRA, the reference samples for CUs inside GRA blocks in intra coded area are in either clean area or intra coded area. However, due to the current VVC design, if the ending GRA block of intra coded is situated on the top-left sub-block of a (parent) block, some reference samples for CUs inside the ending GRA block may be in the dirty area.

Figure 4:
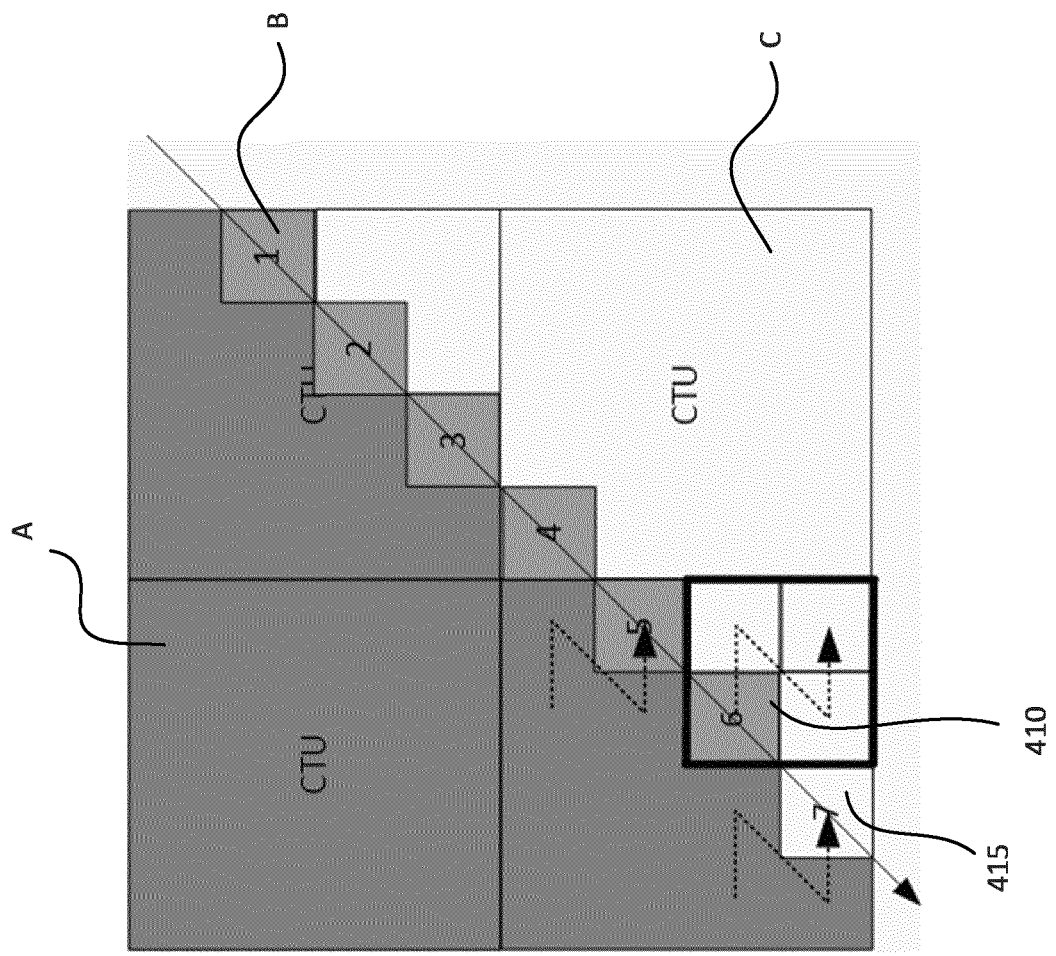
FIG. 4 shows an example of the ending GRA block.

FIG. 4 shows an example, where the clean area is denoted with A, intra coded area is denoted with B and dirty area is denoted with C. The ending GRA block "6" 410 of intra coded area B is the top-left sub-block of a parent block (bolded). In the current VVC design, the ending GRA block "6" 410 will be coded after its bottom-left neighboring block "7" 415. Therefore, block "7" 415 is considered "available" for block "6" 410 for intra prediction, and the reconstructed pixels of block "7" 415 should be used for block "6" 410. The problem is that block "7" 415 is still in dirty area C, which should not be used for the ending GRA block "6" 410 if "exact_match" is required.

In order to tackle this, the present embodiments proposes two possible solutions if the ending GRA block of intra coded area happens to be the top-left sub-block of a (parent) block. First of the solutions is encoder-based solution and the second of the solutions is decoder-based solution.

Figure 5:
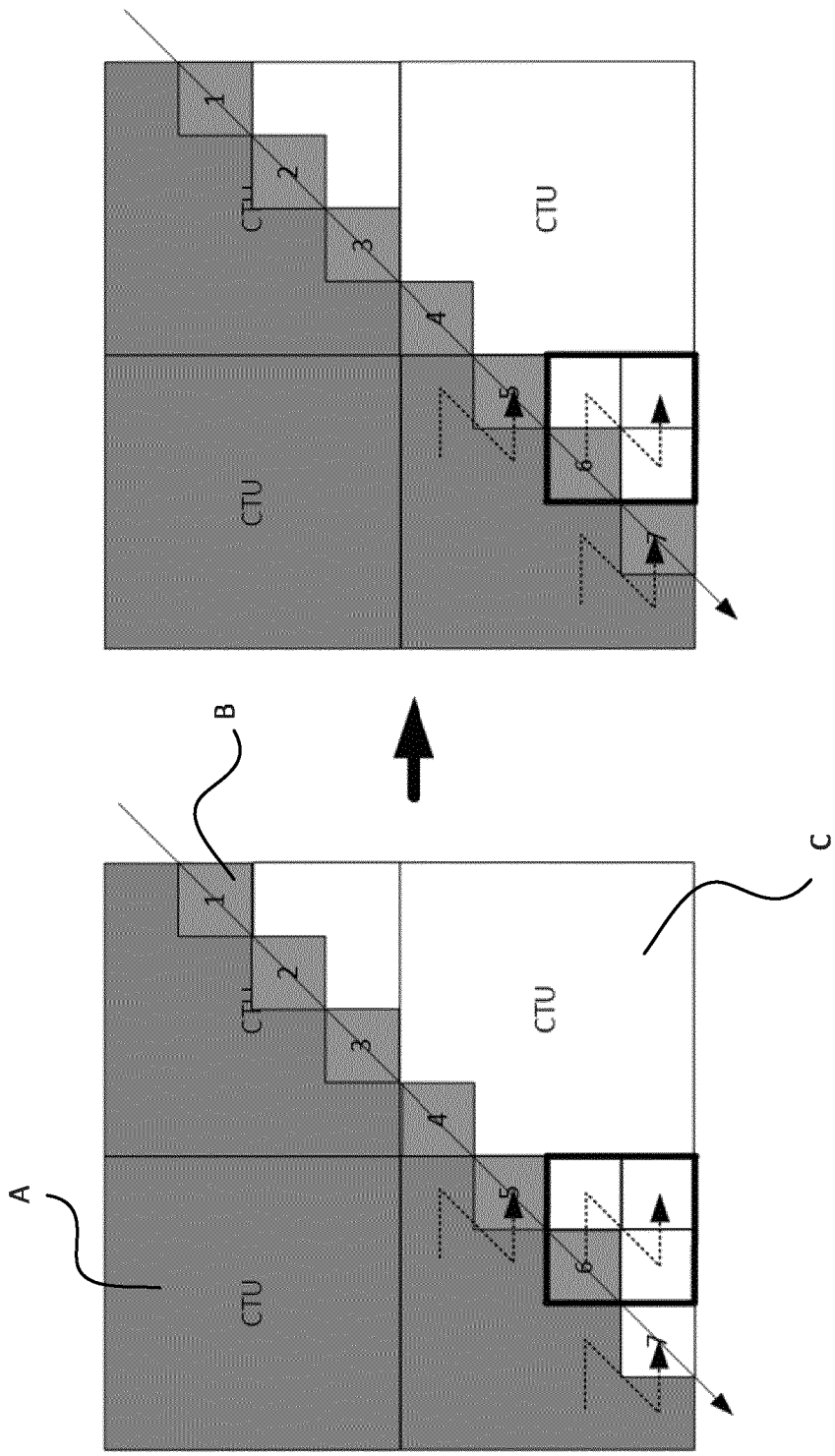
FIG. 5 shows an example of extended intra coded area.

In the first solution, the encoder may extend the intra coded area by one GRA block along the diagonal scan path. FIG. 5 shows an example, where intra coded area B is extended from block "6" (the old ending GRA block) to block "7" (the new encoding GRA block) because block "6" is the top-left sub-block of a (parent) block (bold). Now, the new ending GRA "7" is not a top-left sub-block of a (parent) block. This solution does not require any change in decoder specification.

In the second solution, the decoder may set the reconstructed pixels in dirty area as "not available" for the CUs in intra coded area. In the current VVC design, if marked as "not available", the reconstructed pixels in dirty area will not be used in intra prediction. This decoder solution can be applied to other GRA approaches, e.g. horizontal GRA and vertical GRA.

Code Modes in Clean Area

CUs in clean area may be coded in either intra or inter mode. A CU in inter mode should not use any pixels in dirty areas of reference pictures in constructing its temporal prediction block. A solution that have existed prior the present embodiments is that for a current CU in clean area:
1. select a best inter mode among all the possible inter modes (regular inter, merge, affine, triangle, etc.) based upon their RD cost;
2. perform the validation process for the selected best inter mode. If the associated prediction block does not use the pixels in dirty areas of reference pictures, the selected best inter mode is valid; otherwise, the selected best inter mode is invalid;
3. If the selected best inter mode is valid, it further competes with other non-inter modes in terms of RD cost. If the selected best inter mode is invalid, the current CU can only be coded in intra mode.

Such a solution may result in many intra blocks along the boundaries of clean/intra coded area and dirty area, and it does change ME (Motion Estimation) process for regular inter mode.

According to the present embodiments, there are three possible solutions according to which a performance may be improved.

In the first solution, for a current CU in clean area:
1. perform the validation process for each possible inter modes (regular inter, regular merge, affine, triangle, etc.). If the associated prediction block does not use the pixels in dirty areas of reference pictures, the inter mode is valid; otherwise, it is invalid.
2. select the best mode among all the valid inter modes and other non-inter modes based upon their RD (Rate-distortion) costs.

As compared to the existing solution, the solution of the present embodiments may have more inter blocks along the boundaries of clean/intra code area and dirty area. The first solution does not change ME process for regular inter mode.

In the second solution, for a current CU in clean area:
1. during ME process, restrict motion search range to prevent the prospective prediction block from using the pixels in dirty areas of reference frames.
2. perform the validation process for each possible inter modes (regular merge, affine, triangle, etc.). If the associated prediction block does not use the pixels in dirty areas of reference pictures, the inter mode is valid; otherwise it is invalid
3. select the best mode among all the valid inter modes and other non-inter modes based upon their RD costs.

Since the second solution restricts motion search range during ME process for regular inter mode, regular inter mode will be valid and there will be no need to further check regular inter mode in the validation stage. The second solution likely results in even more inter blocks at the boundaries of clean/intra coded area and dirty area.

In the third solution, for a current CU in clean area:
1. in ME/MC (Motion Estimation/Motion Compensation) process, pad the pixels in dirty areas of reference pictures using the pixels in clean areas or replace the dirt pixels by a fixed value agreed with decoder.
2. select the best mode among possible inter modes and intra modes based upon their RD costs.

The third solution is simple and straightforward. Since the pixels in dirty areas are never used in constructing the prospective perdition blocks for CUs in clean area, validation process is no longer necessary for this solution. This solution likely gives the best performance as compared to the other solutions.

Validation Process for Inter Modes

Because of fractional-pel interpolation process in the current VVC design, the validation process for inter modes can be complicated. The present embodiments propose specific algorithms for validation of inter modes in VVC as follows.

Let MV(x or y) be the horizontal or vertical component of the associated motion vector for an inter mode. In the current VVC design, MV(x or y) is in $1/16$ pel resolution. The integer part of the associated MV is MV>>4.

Figure 6B:
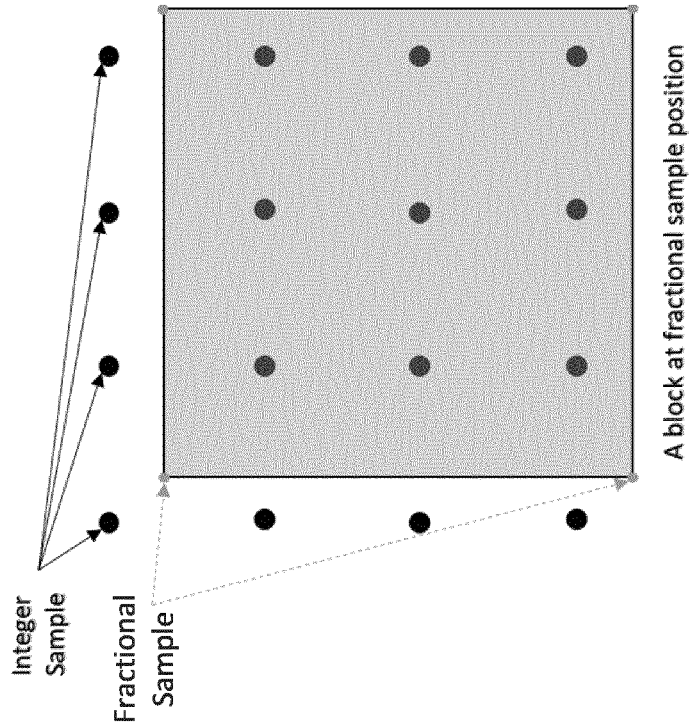
FIG. 6b shows an example of a prediction block at fractional sample position.
Figure 6A:
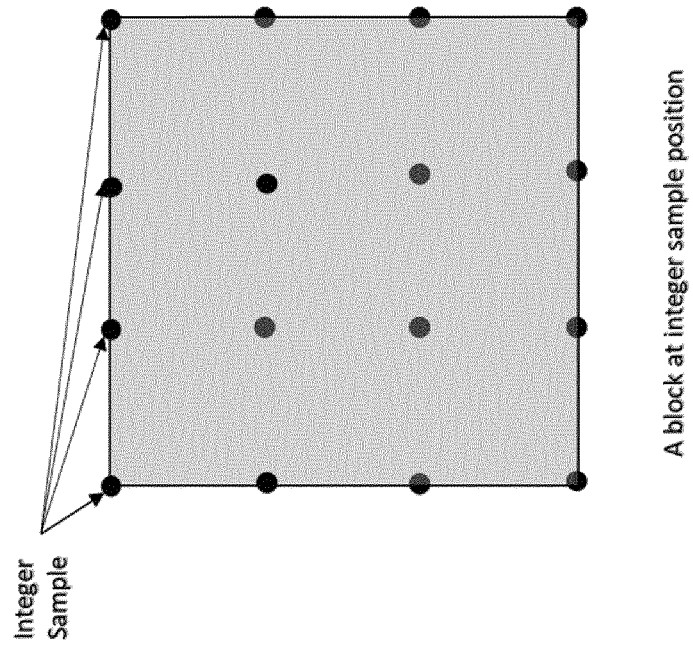
FIG. 6a shows an example of a prediction block at integer sample position.

FIG. 6a shows an example of prediction block at integer sample position. Thus if MV(x or y) % 16==0, MV(x or y) is a full-pel component and the corresponding prediction block is at integer sample position horizontally or vertically, it needs to be checked if the bottom-right pixel of prediction block is in dirty area. If not, the inter mode is valid, otherwise invalid.

FIG. 6b shows an example of prediction block at fractional sample position. Thus, if MV(x or y) % 16!=0, MV(x or y) is a fractional-pel component and the corresponding prediction block is at fractional sample position horizontally or vertically the values of fractional samples are obtained by interpolation process. In the current VVC design, for luma component, the interpolation process uses an 8-tap filter, requiring use of four integer samples on each side of a current fractional sample of prediction block in horizontal direction and/or vertical direction.

Therefore, to prevent use of any pixels in dirty area, if MV(x or y) is a fractional-pel component, the fourth integer sample(s) on the right of (or below) prediction block need to be checked.

Furthermore, for 4:2:0 format, four luma pixels share one chroma pixel. In the current VVC design, for chroma component, the interpolation process for chroma uses a 4-tap filter, requiring use of two integer samples on each side of a current fractional sample of prediction block in horizontal direction and/or vertical direction. To prevent the chroma components of prediction block from using the pixels in dirty areas of reference pictures, it may be taken into account if the integer part of the associated MV(x or y) component is even or odd number.

If the integer part of the associated MV(x or y) component is an even number, the right (or bottom) fractional sample(s) of prediction block will be between an odd-number and an even-number integer sample. In this case, the fourth integer sample on the right of (or below) prediction block needs to be checked.

If the integer part of the associated MV(x or y) component is an odd number, the right (or bottom) fractional sample(s) of prediction block will be between an even-number and an odd-number integer sample. In this case, the fifth integer sample on the right of (or below) prediction block needs to be checked.

Figure 7:
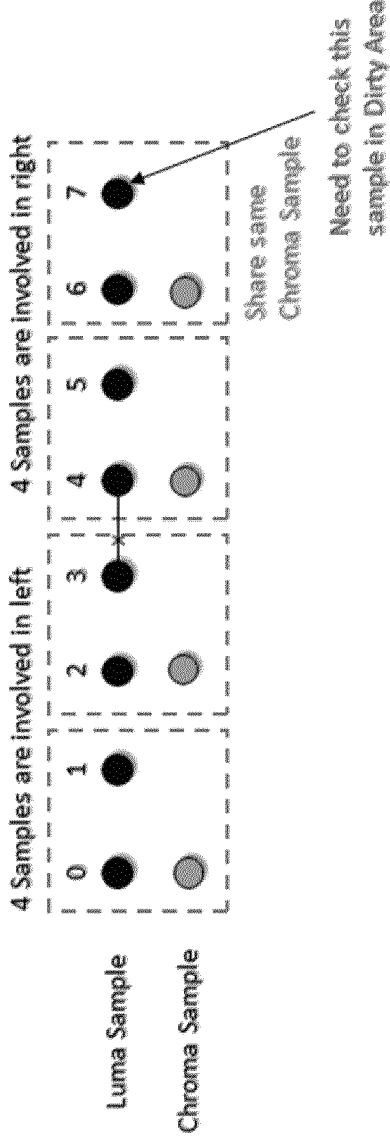
FIG. 7 shows an example of MV(x) being a fractional-pel and the integer part of MV(x) being an even number.

FIG. 7 shows an example for horizontal direction, where it is assumed that the horizontal component MV(x) of MV is a fractional-pel and the integer part of MV(x) is even number. The right fractional sample of prediction block is between odd-number integer sample 3 and even-number integer sample 4. The value of the right fractional sample of prediction block is obtained by interpolation process using four integer samples on each side of the right fractional sample.

In FIG. 7, the four integer samples on the right of prediction block are integer samples 4, 5, 6, and 7. Because with wavefront-based GRA approach, the clean area is in the left of a slice/picture while the dirty area is in the right, and therefore there is only a need to check if integer sample 7, which is the fourth integer sample on the right of prediction block, is in dirty area or not. Note that integer samples 6 and 7 share the same chroma. So, if integer sample 7 is in clean area, integer sample 6 will be in clean area as well, and therefore, the associated chroma will also be in the clean area.

Figure 8:
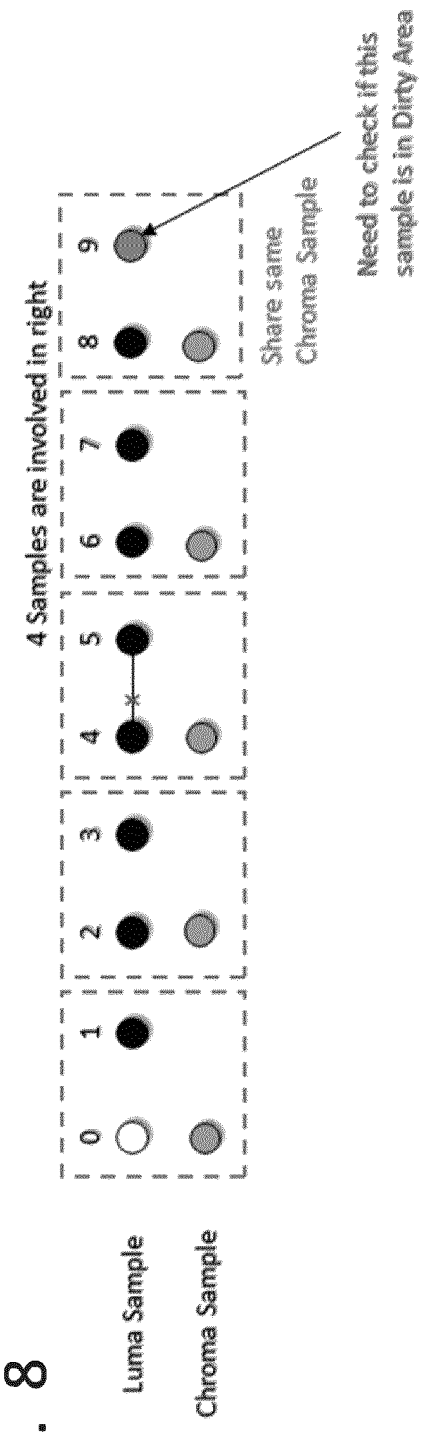
FIG. 8 shows an example of MV(x) being a fractional-pel and the integer part of MV(x) being an odd number.

FIG. 8 shows an example for horizontal direction, where it is assumed that the horizontal component MV(x) of MV is a fractional-pel and the integer part of MV(x) is odd number. The right fractional sample of prediction block is between even-number integer sample 4 and odd-number integer sample 5. The value of the right fractional sample of prediction block is obtained by interpolation process using four integer samples on each side of the right fractional sample.

In FIG. 8, four integer samples on the right of the prediction block are integer samples 5, 6, 7, and 8. For luma component, it is enough to check the integer sample 8. However, since integer samples 8 and 9 share the same chroma, in order to make sure the associated chroma sample is not in dirty area, there is a need to check the integer sample 9, which is the fifth integer sample on the right of prediction block, to see if it is in dirty area or not.

Figure 9:
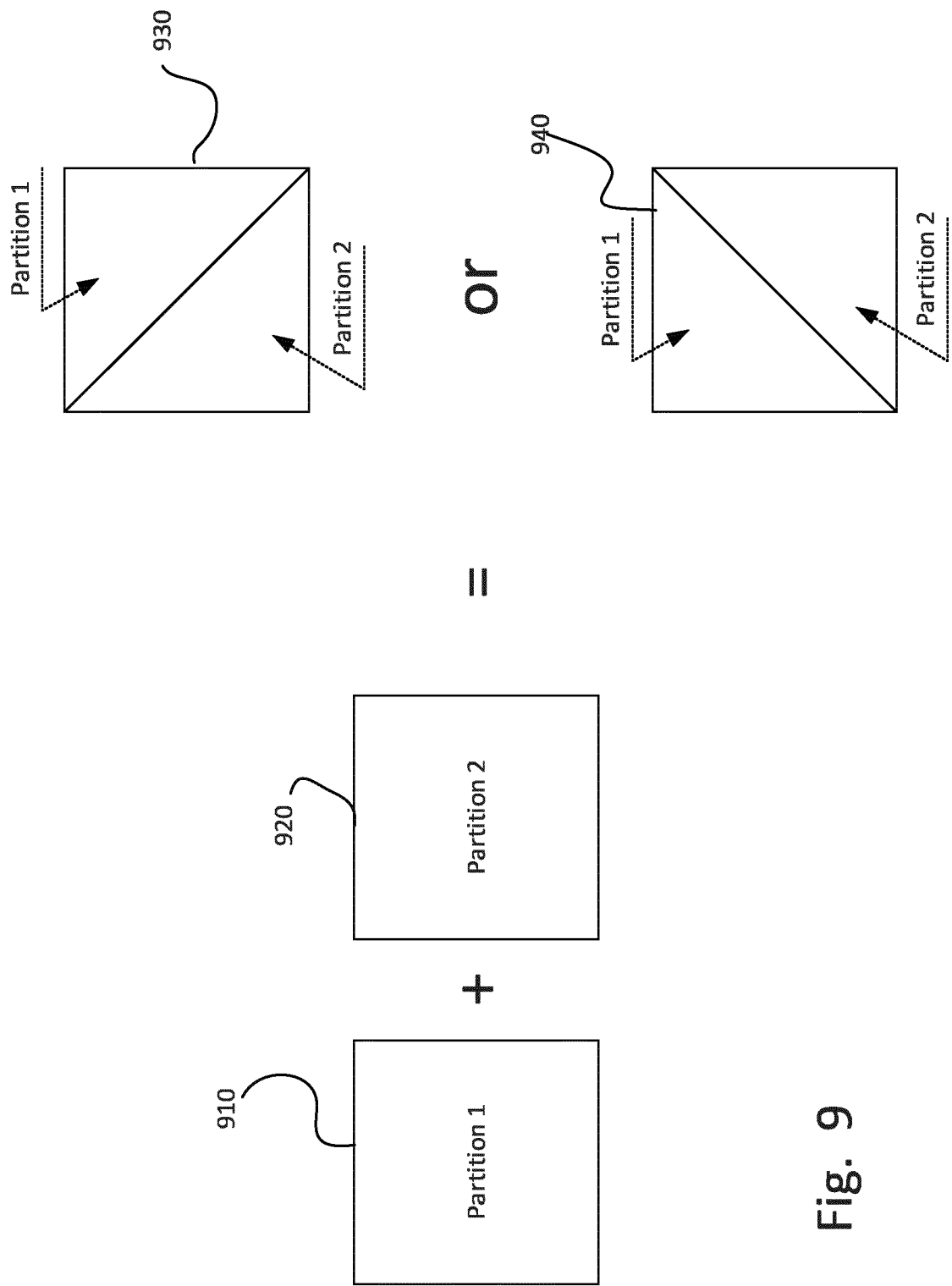
FIG. 9 shows an example of two prediction blocks being blended into a single prediction block.

Triangle prediction mode is a special inter mode. If a current CU is in triangle prediction mode, its prediction block may be formed by blending two prediction blocks together. FIG. 9 shows an example, where two prediction blocks (partitions 1 and 2) 910, 920 for a current CU are determined based upon the MVs of the current CU's neighboring CUs. Then the two prediction blocks 910, 920 are blended into a signal prediction block in either 45 degree 930 or 135 degree 940. Since the prediction block 930, 940 in triangle prediction mode is formed from blending two prediction blocks 910, 920, both prediction blocks 910, 920 need to be validated. If any of them uses the pixels in dirty area, the corresponding triangle prediction mode 930, 940 is invalid.

Padding Process

In one of the solutions for inter mode in clean area may require padding of the pixels in dirty area. Padding is a process where value of a pixel in a dirty area is replaced by value of the closest pixel in the clean area. For example, in horizontal padding, value of the rightmost pixel in the clean area is used for padding and in vertical padding, value of the bottom pixel in the clean area is used for padding.

Also, similar to the validation process, padding process depends upon MV of inter mode in the clean area.

The following paragraphs describe horizontal padding, and similar can be applied to vertical padding:

If MV(x or y) % 16==0, prediction block is at integer sample position, and therefore, the dirty integer samples inside prediction block need to be padded.

Figure 10:
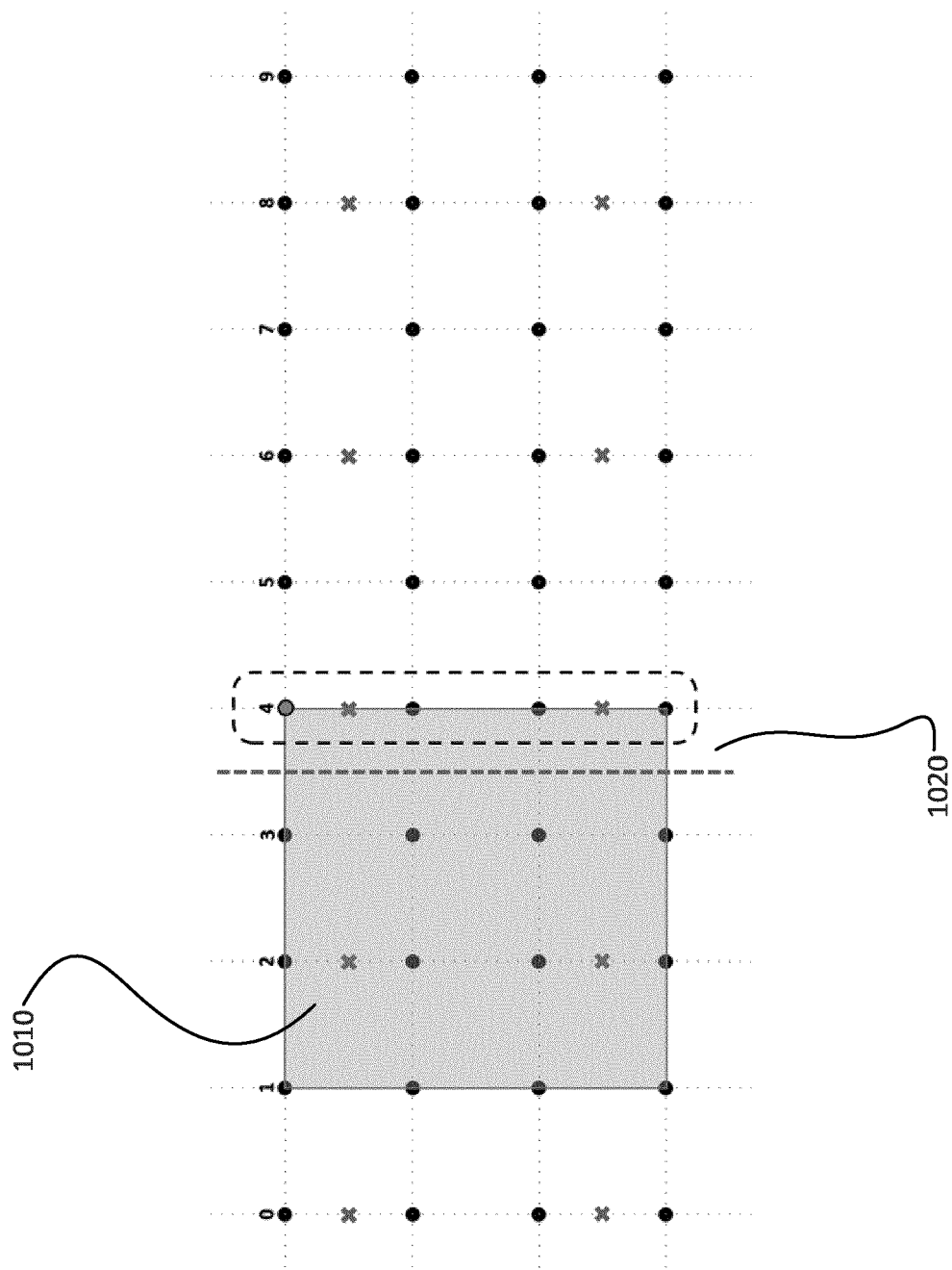
FIG. 10 shows an example of a prediction block being at integer sample position.

FIG. 10 shows an example, where it is assumed that MV(x) % 16==0 and the prediction block 1010 is therefore at integer sample position. The dot line 1020 is the boundary between clean area (left) and dirty area (right). The prediction block 1010 contains both the clean integer samples and the dirty integer samples. The dirty integer samples inside prediction block 1010 are padded with the clean integer samples from the left horizontally.

If MV(x or y) % 16 !=0, in addition to the dirty integer samples covered inside prediction block, additional dirty integer samples outside prediction block need to be padded because of interpolation process.

If the integer part of the associated MV(x or y) component is an even number, the right (or bottom) fractional sample(s) of prediction block will be between an odd-number and an even-number integer sample. In this case, the dirty inter samples covered inside prediction block and also four additional dirty integer sample on the right of (or below) prediction block need to be padded.

If the integer part of the associated MV(x or y) component is an odd number, the right (or bottom) fractional sample(s) of prediction block will be between an even-number and an odd-number integer sample. In this case, the dirty integer samples covered inside prediction block and also five additional integer sample on the right of (or below) prediction block need to be padded.

Figure 11:
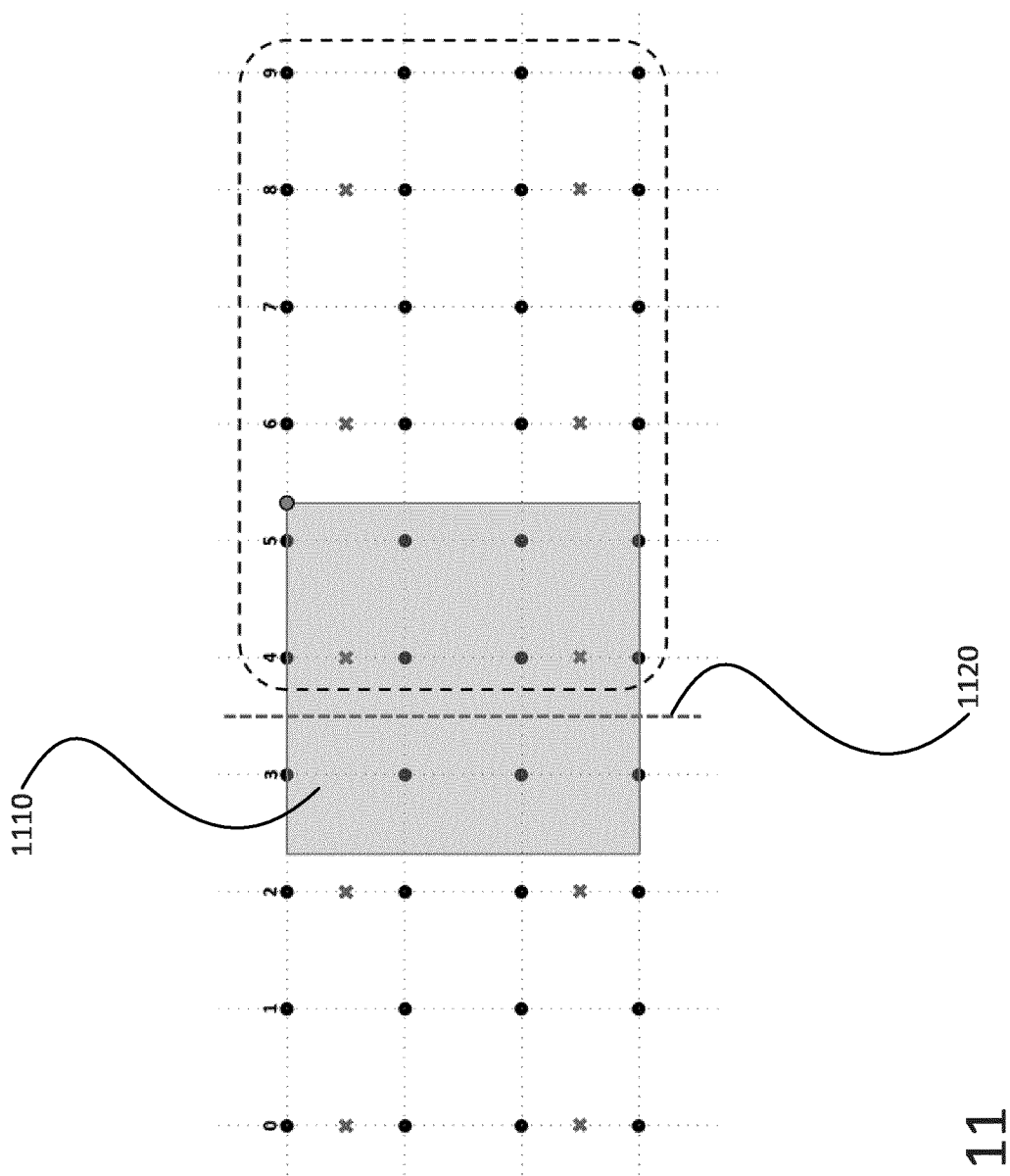
FIG. 11 shows an example of right fractional samples of a prediction block being in between an odd number and an even number.

FIG. 11 shows an example, where it is assumed that MV(x) % 16 !=0 and the integer part of MV(x or y) is an even number, and therefore, the prediction block 1110 is at fractional sample position and its right fractional sample(s) are between an odd-number (5) and an even-number (6) integer sample. The dot line 1120 is the boundary between clean area (left) and dirty area (right).

The fractional samples of prediction block are obtained by interpolation process with 8-tap filter for luma and 4-tap filter for chroma. The interpolation process uses not only the dirty integer samples (4 and 5) covered inside prediction blocks, but also four additional dirty integer samples (6, 7, 8 and 9) on the right of prediction block. All those involved dirty integer samples need to be padded with the integer samples in clean area from the left horizontally. Since integer samples 8 and 9 share the same chroma sample, padding up to integer sample 9 is enough for chroma component as well.

Figure 12:
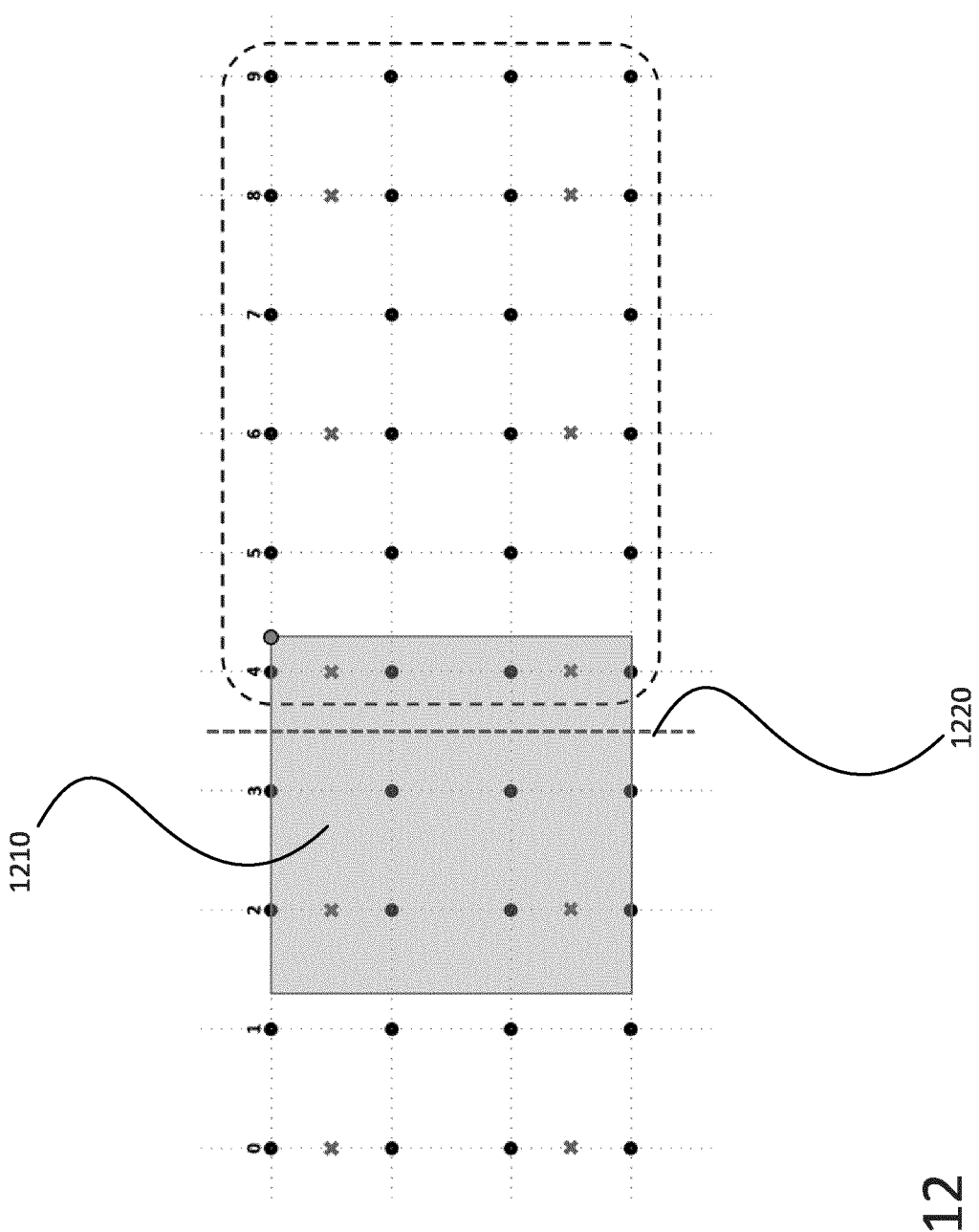
FIG. 12 shows an example of right fractional samples of prediction block being between an even number and an odd number.

FIG. 12 shows an example, where it is assumed that MV(x) % 16 !=0 and the integer part of MV(x or y) is an odd number, and therefore, the prediction block 1210 is at fractional sample position and its right fractional sample(s) are between an even-number (4) and an odd-number (5) integer sample. The dot line 1220 is the boundary between clean area (left) and dirty area (right).

The interpolation process for luma uses the dirty integer samples (4) covered inside prediction block and four additional dirty integer samples (5, 6, 7 and 8) on the right of prediction block. Since integer samples 8 and 9 share the same chroma sample, integer sample(s) 9 should also be included in padding process so that the associated chroma component can also be included in padding process.

Figure 13:
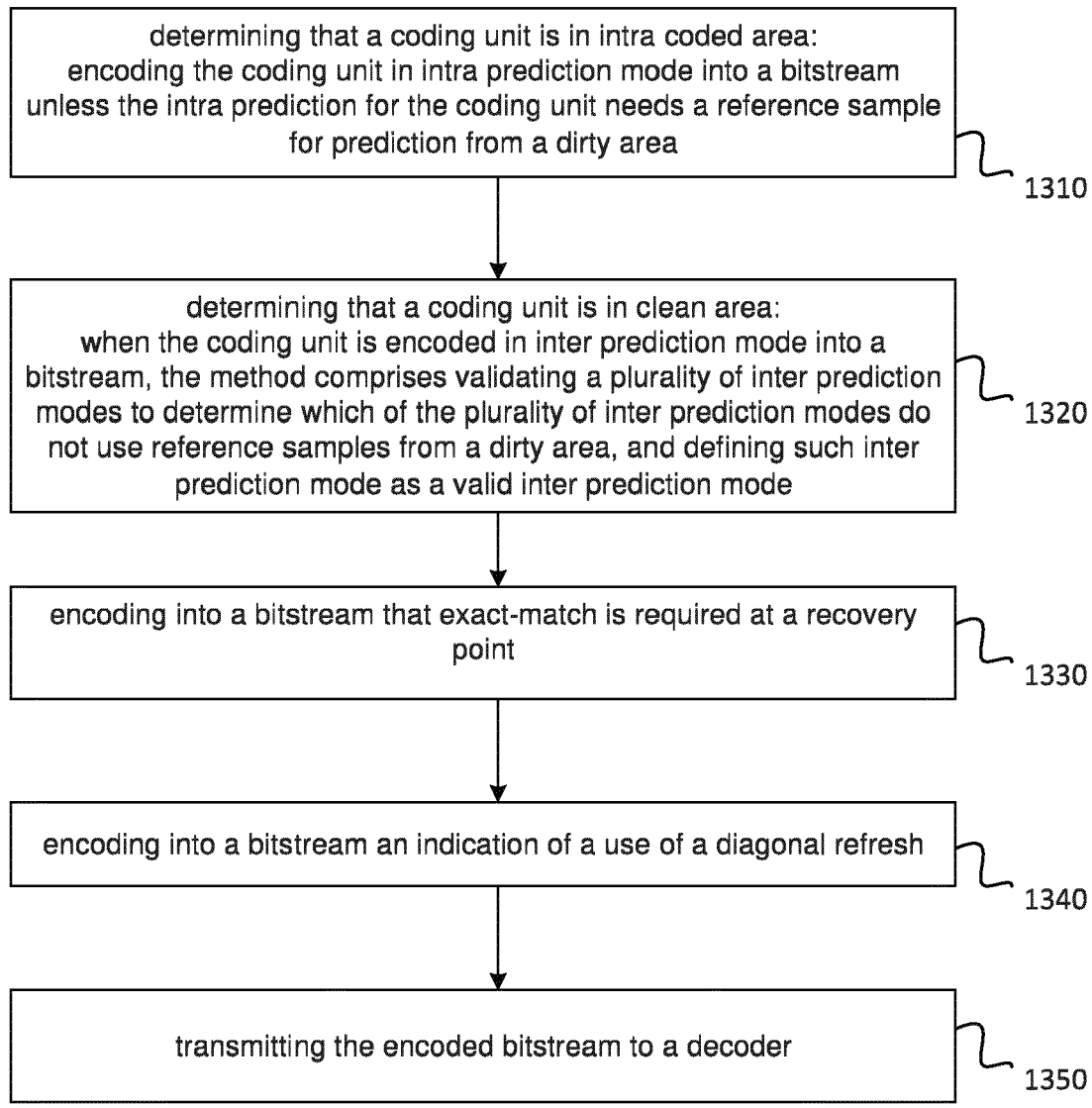
FIG. 13 is a flowchart illustrating a method according to an embodiment.

FIG. 13 is a flowchart illustrating a method according to an embodiment, wherein the method comprises determining 1310 that a coding unit is in intra coded area, whereupon the coding unit is encoded in intra prediction mode into a bitstream unless the intra prediction for the coding unit needs a reference sample for prediction from a dirty area; determining 1320 that a coding unit is in clean area, whereupon when the coding unit is encoded in inter prediction mode into a bitstream, the method comprises validating a plurality of inter prediction modes to determine which of the plurality of inter prediction modes do not use reference samples from a dirty area, and defining such inter prediction mode as a valid inter prediction mode; encoding 1330 into a bitstream that exact-match is required at a recovery point;

encoding 1340 into a bitstream an indication of a use of a diagonal refresh; and transmitting 1350 the encoded bitstream to a decoder.

An apparatus according to an embodiment comprises means for determining that a coding unit is in intra coded area: whereupon the coding unit is encoded in intra prediction mode into a bitstream unless the intra prediction for the coding unit needs a reference sample for prediction from a dirty area; means for determining that a coding unit is in clean area, whereupon when the coding unit is encoded in inter prediction mode into a bitstream, the apparatus comprises means for validating a plurality of inter prediction modes to determine which of the plurality of inter prediction modes do not use reference samples from a dirty area, and defining such inter prediction mode as a valid inter prediction mode; means for encoding into a bitstream that exact-match is required at a recovery point; means for encoding into a bitstream an indication of a use of a diagonal refresh; and means for transmitting the encoded bitstream to a decoder. The means comprises at least one processor and a memory for storing a computer program having computer program code. Wherein the computer program code is read from the memory and executed by the processor to perform the method of flowchart in FIG. 13 according to various embodiments.

Figure 14:
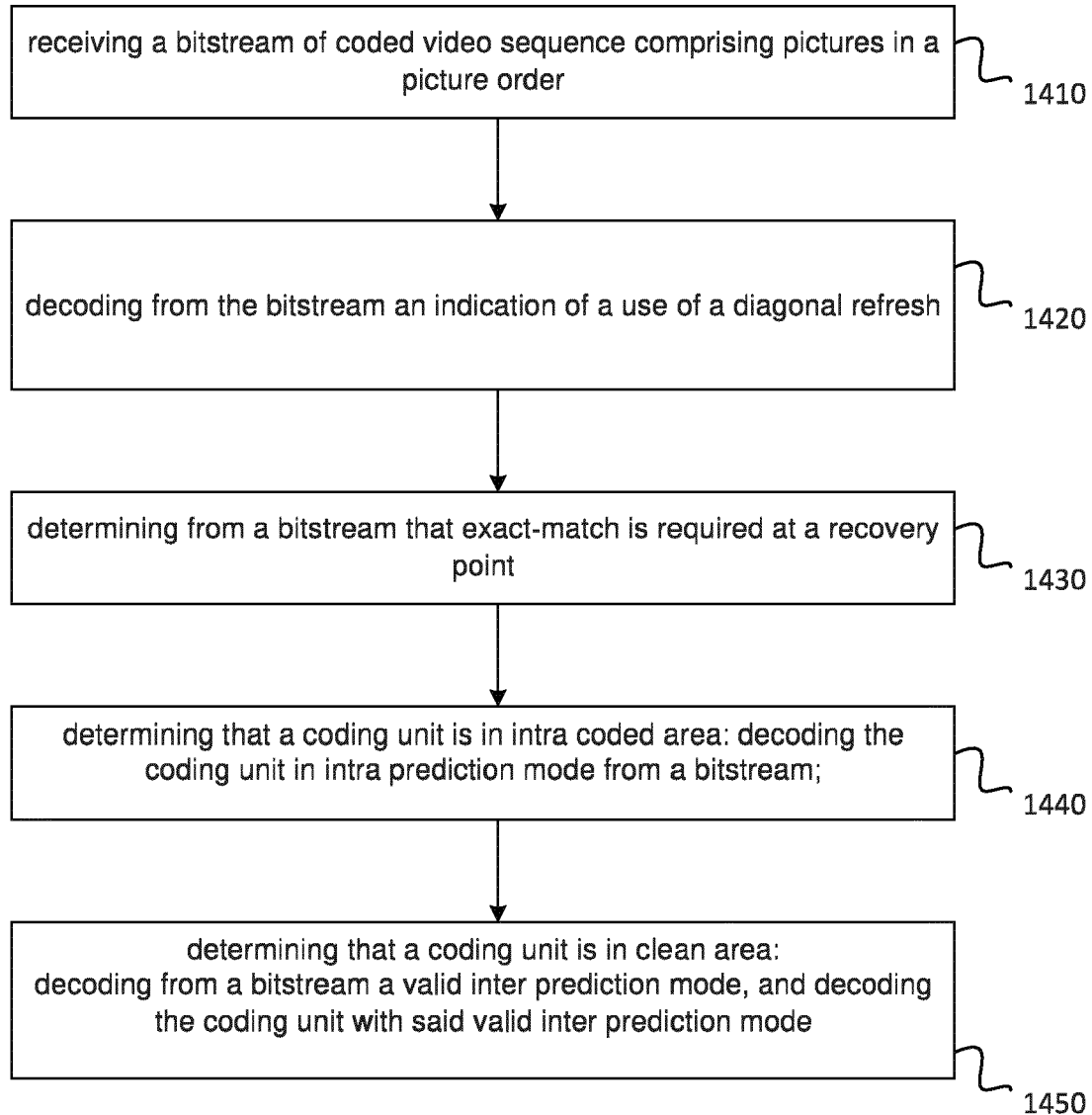
FIG. 14 is a flowchart illustrating a method according to another embodiment.

FIG. 14 is a flowchart illustrating a method according to another embodiment, wherein the method comprises receiving 1410 a bitstream of coded video sequence comprising pictures in a picture order; decoding 1420 from the bitstream an indication of a use of a diagonal refresh; determining 1430 from a bitstream that exact-match is required at a recovery point; determining 1440 that a coding unit is in intra coded area, whereupon the coding unit is decoded in intra prediction mode from a bitstream; determining 1450 hat a coding unit is in clean area: whereupon a valid inter prediction mode is decoded from a bitstream, and decoding the coding unit with said valid inter prediction mode.

An apparatus according to an embodiment comprises means for receiving a bitstream of coded video sequence comprising pictures in a picture order; means for decoding from the bitstream an indication of a use of a diagonal refresh; means for determining from a bitstream that exact-match is required at a recovery point; means for determining that a coding unit is in intra coded area: whereupon the coding unit is decoded in intra prediction mode from a bitstream; means for determining that a coding unit is in clean area, whereupon a valid inter prediction mode is decoded from a bitstream, and the coding unit is decoded with said valid inter prediction mode. The means comprises at least one processor and a memory for storing a computer program having computer program code. Wherein the computer program code is read from the memory and executed by the processor to perform the method of flowchart in FIG. 14 according to various embodiments.

Figure 15:
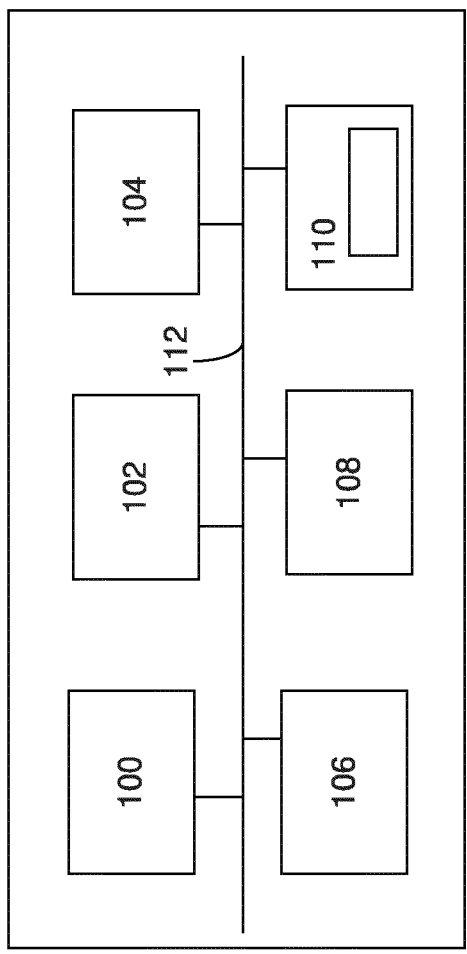
FIG. 15 shows an apparatus according to an embodiment.

An example of a data processing system for an apparatus is illustrated in FIG. 15. Several functionalities can be carried out with a single physical device, e.g. all calculation procedures can be performed in a single processor if desired. The data processing system comprises a main processing unit 100, a memory 102, a storage device 104, an input device 106, an output device 108, and a graphics subsystem 110, which are all connected to each other via a data bus 112.

The main processing unit 100 is a conventional processing unit arranged to process data within the data processing system. The main processing unit 100 may comprise or be implemented as one or more processors or processor circuitry. The memory 102, the storage device 104, the input device 106, and the output device 108 may include conventional components as recognized by those skilled in the art. The memory 102 and storage device 104 store data in the data processing system 100.

Computer program code resides in the memory 102 for implementing, for example a method as illustrated in a flowchart of FIG. 13 or FIG. 14 according to various embodiments. The input device 106 inputs data into the system while the output device 108 receives data from the data processing system and forwards the data, for example to a display. The data bus 112 is a conventional data bus and while shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

Figure 16:
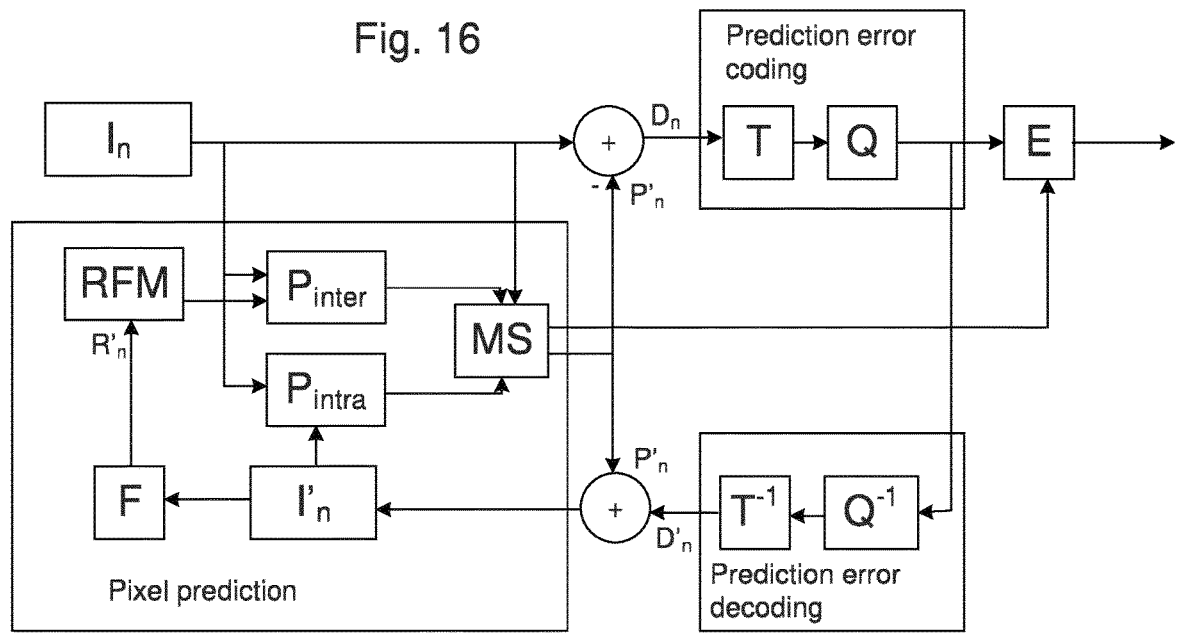
FIG. 16 shows an encoding process according to an embodiment.
Figure 17:
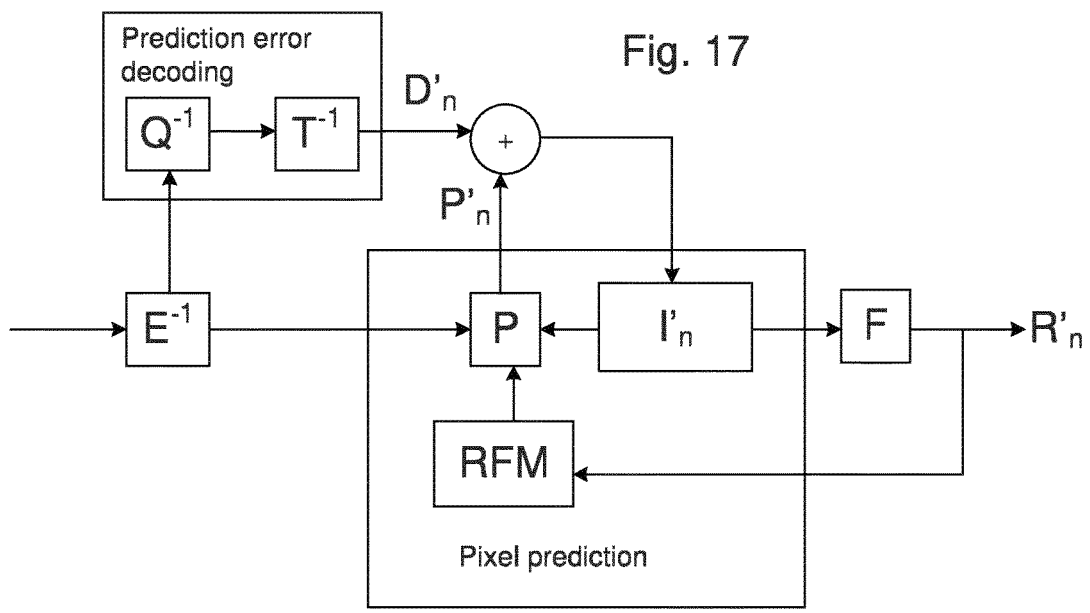
FIG. 17 shows a decoding process according to an embodiment.

FIG. 16 illustrates an example of a video encoder, where $I_n$: Image to be encoded; $P'_n$: Predicted representation of an image block; $D_n$: Prediction error signal; $D'_n$: Reconstructed prediction error signal; I'n: Preliminary reconstructed image; R'n: Final reconstructed image; T, $T^{-1}$: Transform and inverse transform; Q, $Q^{-1}$: Quantization and inverse quantization; E: Entropy encoding; RFM: Reference frame memory; $P_{inter}$: Inter prediction; $P_{intra}$: Intra prediction; MS: Mode selection; F: Filtering. FIG. 17 illustrates a block diagram of a video decoder where $P'_n$: Predicted representation of an image block; $D'_n$: Reconstructed prediction error signal; $I'_n$: Preliminary reconstructed image; $R'_n$: Final reconstructed image; $T^{-1}$: Inverse transform; $Q^{-1}$: Inverse quantization; $E^{-1}$: Entropy decoding; RFM: Reference frame memory; P: Prediction (either inter or intra); F: Filtering. An apparatus according to an embodiment may comprise only an encoder or a decoder, or both.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus. The programmable operational characteristic of the system are for implementing a method according to FIG. 10 or FIG. 11 according to various embodiments.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
   determining that a first coding unit is in an intra coded area;
   encoding the first coding unit in an intra prediction mode into a bitstream when an intra prediction for the first coding unit does not need a reference sample for prediction from a dirty area;
   determining that a second coding unit is in a clean area: when the second coding unit is encoded in an inter prediction mode into the bitstream;
   validating a plurality of inter prediction modes to determine which of the plurality of inter prediction modes do not use reference samples from a dirty area, and defining an inter prediction mode that do not use reference samples from a dirty area as a valid inter prediction mode,
   wherein when a reference sample for intra prediction for a coding unit is in the dirty area, the intra coded area is extended by at least one gradual random access block;
   encoding into the bitstream that exact-match is required at a recovery point;
   encoding into the bitstream an indication of a use of a diagonal refresh; and
   transmitting the encoded bitstream to a decoder.

2. A method comprising:
   determining that a first coding unit is in an intra coded area;
   encoding the first coding unit in an intra prediction mode into a bitstream when an intra prediction for the first coding unit does not need a reference sample for prediction from a dirty area,
   wherein when the reference sample for the intra prediction for the first coding unit is in the dirty area;
   extending the intra coded area by at least one gradual random access block;
   determining that a second coding unit is in a clean area: when the second coding unit is encoded in an inter prediction mode into the bitstream;
   validating a plurality of inter prediction modes to determine which of the plurality of inter prediction modes do not use reference samples from a dirty area, and defining an inter prediction mode that do not use reference samples from a dirty area as a valid inter prediction mode;
   encoding into the bitstream that exact-match is required at a recovery point; and
   encoding into the bitstream an indication of a use of a diagonal refresh.

3. The method according to claim 1, wherein when the reference sample for intra prediction for a coding unit is in the dirty area, the method further comprises setting the reference sample as a non-available for prediction.

4. The method according to claim 1, wherein validating the plurality of inter prediction modes comprises determining a best inter prediction mode among valid inter prediction modes based upon rate-distortion costs.

5. The method according to claim 1, wherein validating the plurality of inter prediction modes comprises: determining a motion search range for an inter prediction mode so that a prediction block for the inter prediction mode does not use reference samples in the dirty area; and validating other possible inter prediction modes to determine a best prediction mode among the valid inter prediction modes and intra prediction modes based upon a rate-distortion cost for coding a coding unit.

6. The method according to claim 1, wherein validating the plurality of inter prediction modes comprises: determining whether a prediction block needs a sample from the dirty area; and padding the sample in the dirty area by using pixels from the clean area.

7. The method according to claim 6, wherein the padding comprises replacing a value of the sample in the dirty area by a value of a closest sample in the clean area.

8. A method, comprising
   receiving a bitstream of a coded video sequence comprising pictures in a picture order;
   decoding from the bitstream an indication of a use of a diagonal refresh;
   determining from the bitstream that an exact-match is required at a recovery point;
   determining that a first coding unit is in intra coded area: decoding the first coding unit in intra prediction mode from the bitstream;
   determining that a second coding unit is in clean area: decoding from the bitstream a valid inter prediction mode,
   wherein when a reference sample for intra prediction for a coding unit is in the dirty area, the intra coded area is extended by at least one gradual random access block; and
   decoding the second coding unit with said valid inter prediction mode.

9. An apparatus, comprising:
   at least one processor, and
   at least one non-transitory memory storing instructions, that when executed by the at least one processor, cause the apparatus to:
   determine that a first coding unit is in an intra coded area;
   encode the first coding unit in an intra prediction mode into a bitstream when an intra prediction for the first coding unit does not needs a reference sample for prediction from a dirty area;
   determine that a second coding unit is in a clean area: when the second coding unit is encoded in an inter prediction mode into the bitstream;
   validate a plurality of inter prediction modes to determine which of the plurality of inter prediction modes do not use reference samples from a dirty area, and define an inter prediction mode that do not use reference samples from a dirty area as a valid inter prediction mode,
   wherein when a reference sample for intra prediction for a coding unit is in the dirty area, the apparatus is further caused to extend the intra coded area by at least one gradual random access block;
   encode into the bitstream that exact-match is required at a recovery point; encode into the bitstream an indication of a use of a diagonal refresh; and
   transmit the encoded bitstream to a decoder.

10. The apparatus according to claim 9, wherein when the reference sample for intra prediction for a coding unit is in the dirty area, the apparatus is further caused to set the reference sample as a non-available for prediction.

11. The apparatus according to claim 9, wherein to validate the plurality of inter prediction modes the apparatus is further caused to determine a best inter prediction mode among valid inter prediction modes based upon rate-distortion costs.

12. The apparatus according to claim 9, wherein to validate the plurality of inter prediction modes, the apparatus is further caused to determine a motion search range for an inter prediction mode so that a prediction block for the inter prediction mode does not use reference samples in the dirty area; and to validate other possible inter prediction modes to determine a best prediction mode among the valid inter prediction modes and intra prediction modes based upon a rate-distortion cost for coding a coding unit coding unit.

13. The apparatus according to claim 9, wherein the apparatus is further caused to determine if the prediction block needs a sample from the dirty area, pad the sample in the dirty area using pixels from a clean area.

14. The apparatus according to claim 13, wherein the apparatus is caused to replace a value of a sample in the dirty area by a value of a closest sample in the clean area for padding.

15. An apparatus, comprising:
at least one processor, and
at least one non-transitory memory storing instructions, that when executed by the at least one processor, cause the apparatus to:
receive a bitstream of a coded video sequence comprising pictures in a picture order;
decode from the bitstream an indication of a use of a diagonal refresh;
determine from the bitstream that an exact-match is required at a recovery point;
determine that a first coding unit is in intra coded area:
decode the first coding unit in intra prediction mode from a bitstream;
determine that a second coding unit is in clean area,
wherein when a reference sample for intra prediction for a coding unit is in the dirty area, the apparatus is further caused to extend the intra coded area by at least one gradual random access block:
decode from the bitstream a valid inter prediction mode, and
decode the second coding unit with said valid inter prediction mode.

\* \* \* \* \*